US011436265B2

(12) United States Patent
Osotio et al.

(10) Patent No.: US 11,436,265 B2
(45) Date of Patent: Sep. 6, 2022

(54) SYSTEM FOR PRESENTING TAILORED CONTENT BASED ON USER SENSIBILITIES

(71) Applicant: Microsoft Technology Licensing, LLC, Redmond, WA (US)

(72) Inventors: Neal Osotio, Sammamish, WA (US); YoungSun Park, Vancouver (CA); Brook Durant, Bellevue, WA (US); Eric Schuh, Seattle, WA (US); Bradford Singley, Renton, WA (US); Eun Joo Lee, Long Island City, NY (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 431 days.

(21) Appl. No.: 15/620,998

(22) Filed: Jun. 13, 2017

(65) Prior Publication Data

US 2018/0357306 A1 Dec. 13, 2018

(51) Int. Cl.
*G06F 16/00* (2019.01)
*G06F 16/335* (2019.01)
*G06F 3/01* (2006.01)
*G06F 16/332* (2019.01)
*G06V 40/20* (2022.01)
*G06V 40/16* (2022.01)

(52) U.S. Cl.
CPC ............ *G06F 16/337* (2019.01); *G06F 3/017* (2013.01); *G06F 16/3329* (2019.01); *G06V 40/174* (2022.01); *G06V 40/20* (2022.01)

(58) Field of Classification Search
None
See application file for complete search history.

(56) References Cited

U.S. PATENT DOCUMENTS 7,983,996 B2 * 7/2011 Hanneman ............. G06N 3/004
706/11
8,140,821 B1 * 3/2012 Raizen ................ G06F 11/1448
707/637

(Continued)

OTHER PUBLICATIONS

"International Search Report and Written Opinion Issued in PCT Application No. PCT/US18/034026", dated Aug. 7, 2018, 12 Pages.

*Primary Examiner* — Farhan M Syed
(74) *Attorney, Agent, or Firm* — Calfee, Halter & Griswold LLP

(57) ABSTRACT

Systems, methods, and apparatuses for implementing a digital personal assistant. The digital personal assistant determining that a user has initiated a user experience with it. In response, the digital personal assistant collects information concerning the user's sensibilities about content and a current context in which the digital personal assistant is being used. With that information, the digital personal assistant infers facets of the user's sensibilities and deduces a context of use. With those inferences and that deduction, the digital personal assistant evaluates whether the presentation of responsive content should be modified to better comport with the user's sensibilities and to be more appropriate for the context of use. Additionally, in response to determining a user's need for content, the digital personal assistant can use the inference and deduction to supply suggested content to the user.

20 Claims, 10 Drawing Sheets

(56) References Cited

U.S. PATENT DOCUMENTS

| | | | |
|---|---|---|---|
| 8,407,445 B1* | 3/2013 | Pathak | G06F 3/0683 |
| | | | 711/170 |
| 9,275,641 B1* | 3/2016 | Gelfenbeyn | G10L 15/26 |
| 9,449,275 B2* | 9/2016 | Hubauer | G05B 23/0278 |
| 10,170,106 B2* | 1/2019 | Gelfenbeyn | G10L 15/08 |
| 10,546,067 B2* | 1/2020 | Gelfenbeyn | G10L 15/22 |
| 2006/0179022 A1* | 8/2006 | Holland | G06N 3/004 |
| | | | 706/45 |
| 2008/0189768 A1* | 8/2008 | Callahan | H04L 63/104 |
| | | | 726/4 |
| 2015/0262209 A1* | 9/2015 | Orsini | G06F 40/242 |
| | | | 705/14.11 |
| 2016/0063874 A1* | 3/2016 | Czerwinski | G16H 50/20 |
| | | | 434/236 |
| 2016/0078866 A1* | 3/2016 | Gelfenbeyn | G10L 15/02 |
| | | | 704/235 |
| 2016/0260029 A1* | 9/2016 | Gelfenbeyn | G06N 5/022 |
| 2017/0090766 A1* | 3/2017 | Gong | G06F 3/0673 |
| 2017/0116982 A1* | 4/2017 | Gelfenbeyn | G10L 15/1815 |
| 2017/0185582 A1* | 6/2017 | Gelfenbeyn | G10L 15/26 |
| 2018/0165580 A1* | 6/2018 | Boyer | G06F 16/00 |
| 2019/0139538 A1* | 5/2019 | Gelfenbeyn | H04M 3/4936 |
| 2020/0111486 A1* | 4/2020 | Gelfenbeyn | G06F 3/0481 |

* cited by examiner

SYSTEM FOR PRESENTING TAILORED CONTENT BASED ON USER SENSIBILITIES

BACKGROUND

Past advancements in networking and computing technologies have enabled computing devices, including personal computing devices, to provide digital personal assistant functionality (i.e., a digital personal assistant). In a general sense, a digital personal assistant is a representation of an entity that interacts with a user of a device and that responds to user input. For instance, a digital personal assistant may answer questions asked by a user or perform tasks based on instructions from the user. Some specific examples of tasks to which digital personal assistants are well-suited to assist users include: consuming content from messages, mail, or web sites; writing messages/emails; placing phone/video calls; consuming media such as music/photos/videos; setting alarms, reminders, and calendar events; performing web searches; and receiving suggestions.

Digital assistant functionality has made computing devices: easier to use; more useful; and more accessible. Still, until recently, conventional digital personal assistants have lacked the ability to act like anything other than a computing device (i.e., a machine).

Presently, however, a revolution is taking place. It has now become practical to provide digital personal assistant functionality that makes computing devices seem to be at least semi-sentient. That is to say, to provide functionality that may be at least partially characterized as "intelligent" or "smart." In particular, digital personal assistants can now make inferences about how to respond to a user's input. This ability to make inferences enhances overall utility by, for example, increasing the responsiveness of a device output. Also, this ability promotes a more engaging user experience—for some users.

For many users, however, this user experience offers a sub-optimal experience and introduces a new problem.

Recent investigation has revealed that many people simply distrust (e.g., exhibit a strong prejudice) "artificial intelligence." This distrust the new wave of "smart" computing devices offering "smart" (i.e., seemingly semi-sentient) digital personal assistants. The bases for this distrust are myriad. For some, their distrust can be rooted in cultural experiences such as science fiction films, many of which have presented artificial intelligence as dangerous. For others, an absence of understanding of how "smart" devices make inferences lead to distrust. For others still, their distrust can be rooted in political philosophies, such as privacy concerns (i.e., a fear of "big brother"). Moreover, for many, their distrust is the result of various combinations of these concerns and others. In any event, regardless of the reason, many users who would otherwise benefit from "smart" digital assistants resist them because of the robot user-experience that they offer.

BRIEF SUMMARY

This Brief Summary is provided to introduce a selection of concepts in simplified form. It is intended to provide basic understandings of some aspects of the disclosed, innovative subject matter. Its sole purpose is to present some concepts in a simplified form as a prelude to the more detailed description that is presented later. The introduced concepts are further described below in the Description.

This Brief Summary is not an extensive overview of the disclosed, innovative subject matter. Also, it is neither intended to identify "key," "necessary," or "essential" features of the claimed subject matter, nor is it intended to limit the scope of the claimed subject matter.

Innovations described herein generally pertain to strategies for increasing trust between a user and functionality that exhibits "artificial intelligence" (e.g., a digital personal assistant provided by a "smart" device). Increasing trust in such functionality promotes: wider adoption; and/or continued use of and interaction with it.

Innovations described herein also generally pertain to strategies for implementing digital personal assistant functionality exhibiting artificial intelligence. This digital personal assistant functionality can provide tailored and/or customized responses to a user inputs that are intended to be consistent with a user's individual morals, ethics, sensitivities, moods, cultural backgrounds, personality, sophistication, politics etc. (i.e., sensibilities) and a context in which the functionality is being provided. Tailoring a user's experience in this way promotes user confidence and trust in this technology by, for example, encouraging trust in the validity of information provided in the user experience.

Further, innovations described herein reflect a digital personal assistant (i.e., a digital persona) that is operable to infer sensibilities of a user relative to content and to deduce a context of use. Then, based on the determined sensibilities and context of use, it is operable to synthesize a strategy to modify responsive content so that it is more likely to be consistent with the user's sensibilities. Additionally, or alternatively, the sensibilities and/or context of use can be provided by a user and/or retrieved from a data store. With that information, when a user asks a question or makes a statement that is intended to cause the digital personal assistant to take an action (e.g., to search, retrieve, and deliver content in response to an inquiry), responsive content is obtained. Before delivery of the responsive content, however, a manner by which to tailor the delivery of the content so that the provision will likely be consistent with the user's sensibilities is resolved. By tailoring the delivery of responsive content in this way, the user experience is enhanced, which promotes greater user engagement.

According to an aspect of the present invention, there is provided a method of increasing user trust in a computing device by tailoring provision of content from the computing device to the user. The method includes several operations, including: receiving first data that is usable to infer facets of the user's sensibilities; inferring one or more facets of the user's sensibilities, based on the received first data; receiving second data that is usable to deduce a context of use of the computing device; deducing the context of use of the computing device, based on the received second data; resolving a manner by which to tailor the provision of responsive content so as to increase a likelihood that the provision will be consistent with the user's sensibilities, based on the inferred one or more facets and the deduced context of use; and tailoring a manner by which the content will be presented to the user, based on the resolved manner so that the user, will be presented with the responsive content in a manner that is likely to be consistent with the user's sensibilities.

According to another aspect of the present invention, there is provided a method of increasing use of computing devices by identifying ways to selectively tailor presentation of content by one or more computing devices. The method includes the following operations: receiving content that is responsive to a received user inquiry or directive; obtaining a user experience model corresponding to the user, the user experience model comprising information that is usable to selectively tailor a presentation of the responsive content;

determining whether presentation of the responsive content without modification would be inconsistent with the user's sensibilities, as reflected by the experience model; and identifying ways to selectively tailor an operation by which the responsive content is presented to increase a likelihood that the responsive content, as presented, will not be inconsistent with the user's sensibilities.

According to still another aspect of the present invention, there is provided a system that enhances user trust by customizing presentation of responsive content. The system includes: an end user device; a processing portion including one or more processing devices; and a storage portion that includes one or more memory devices that are accessible to the processing portion. The one or more memory devices collectively store components for execution by the processing portion. These components include: a context of use component that is operable to determine a context of use of the end user device, based on use context information; a user sensibility component that is operable to infer facets of a user's sensibilities concerning content, based on sensibility information for a particular user; and a user experience customization component that is operable to identify ways to adjust a presentation of responsive content so that the presentation will likely comport with the particular user's sensibilities.

According to yet another aspect of the present invention, there is provided a computing system that includes: at least one processor; and at least one memory that stores computer program logic for execution by the at least one processor, the computer program logic including one or more components configured to perform operations when executed by the at least one processor. The one or more components including: a digital personal assistant configured to capture an input from a user via a device representing a front end of the digital personal assistant and to transmit the input to a digital personal assistant backend, the input intended to engage with the digital personal assistant; a digital personal assistant backend configured to: deduce a context of use of the device; infer aspects of the user's sensibilities concerning content; determine whether a presentation of responsive content would likely be inconsistent with the user's sensibilities and/or inappropriate for the deduced context of use; and identify ways to adapt the presentation of the responsive content so that presentation of the responsive content would at least be likely to be consistent with the user's sensibilities ad appropriate for the context of use. The digital personal assistant is also configured to provide, based at least on information received from the digital personal assistant backend, a response that is tailored to be consistent with the user's sensibilities concerning content.

Additionally, the digital personal assistant may be configured to infer a user's need for suggested content and to present content responsive to that inferred need in a manner that is consistent with the user's sensibilities and appropriate for the context of use. This presentation of suggested content may use the inferences and deductions made for the presentation of responsive content or may initiate such operations when a need for suggested content is inferred.

Furthermore, the present invention may be embodied as a computer system, as any individual component of such a computer system, as a process performed by such a computer system or any individual component of such a computer system, or as an article of manufacture including computer storage with computer program instructions and which, when processed by computers, configure those computers to provide such a computer system or any individual component of such a computer system. The computer system may be a distributed computer system. The present invention may also be embodied as software or processing instructions.

These, additional, and/or other aspects and/or advantages of the present invention are: set forth in the detailed description which follows; possibly inferable from the detailed description; and/or learnable by practice of the present invention. So, to the accomplishment of the foregoing and related ends, certain illustrative aspects of the claimed subject matter are described herein in connection with the following description and the annexed drawings. These aspects are indicative of various ways in which the subject matter may be practiced, all of which are within the scope of the claimed subject matter. Other advantages, applications, and novel features may become apparent from the following detailed description when considered in conjunction with the drawings.

BRIEF DESCRIPTION OF THE DRAWINGS

The accompanying drawings, which are incorporated herein and form part of the specification, illustrate aspects of the present invention and, together with the description, further serve to explain principles of the present invention and to enable a person skilled in the relevant art(s) to make and use the invention. These aspects are consistent with at least one embodiment of the present invention.

DESCRIPTION

I. Introduction and Lexicography

Figure 1A:
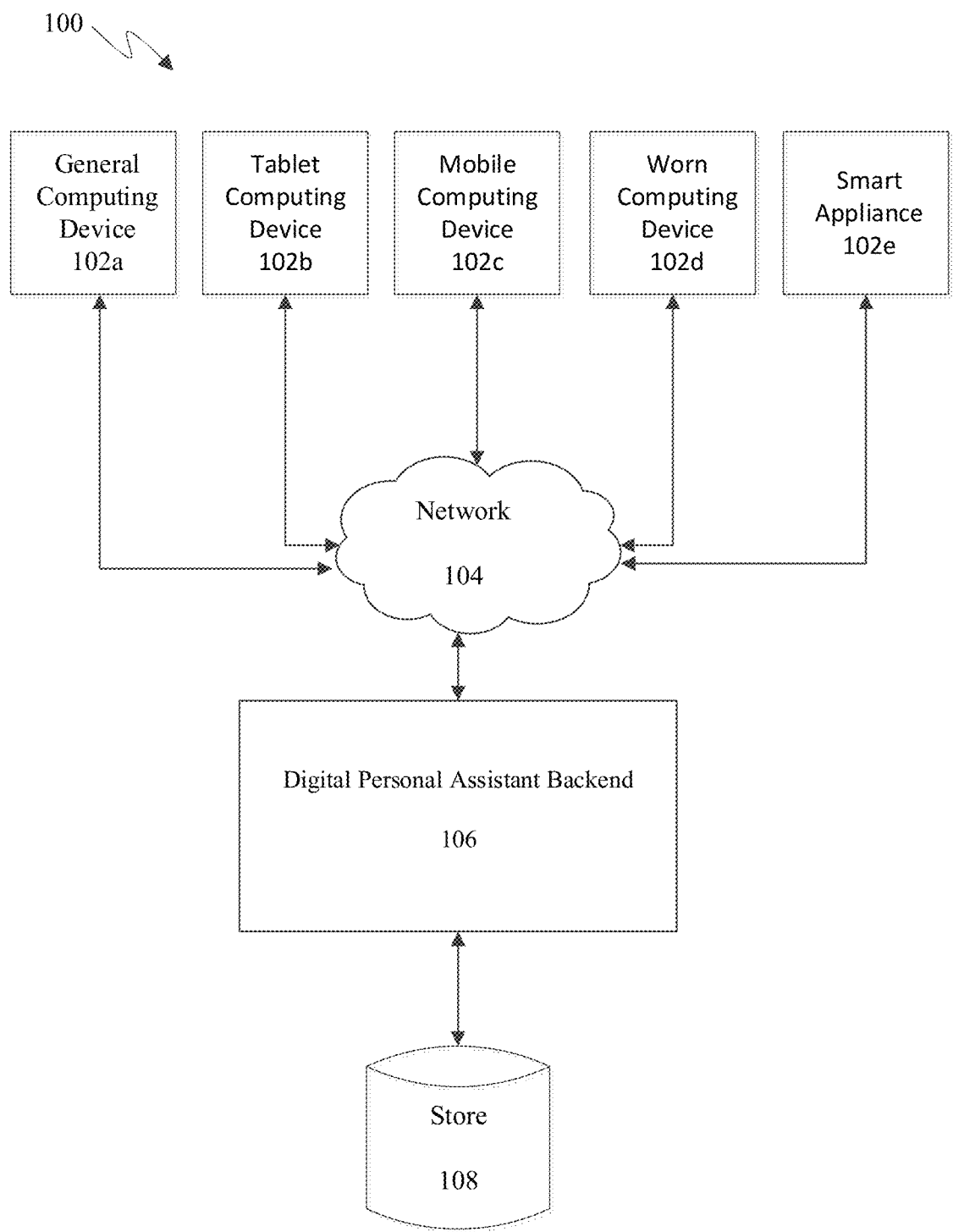
FIG. 1A is a simplified block diagram illustrating an example of a distributed computing system that implements a digital personal assistant that tailors responsive outputs in a manner that is consistent with one or more embodiments of the present invention.

Preliminarily, some of the figures describe one or concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the actual use of corresponding distinct components. Additionally, or alternatively, any single component illustrated in the figures may be implemented by plural components. Additionally, or alternatively, the depiction of any two or more separate components in the figures may reflect different functions performed by a single component.

Others of the figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

The various aspects of the inventors' innovative discoveries are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

As to terminology, the phrase "configured to" is both contemplated and to be understood to encompass any way that any kind of functionality can be constructed to perform an identified operation. The functionality can be configured to perform an operation using, for instance, software, hardware (e.g., discrete logic components, etc.), firmware etc., or any combination thereof.

The term "logic" is both contemplated and to be understood to encompass any functionality for performing a task. For instance, each operation illustrated in the flowcharts corresponds to logic for performing that operation. An operation can be performed using, for instance, software, hardware (e.g., discrete logic components, etc.), firmware, etc., or any combination thereof. So, references to logic includes references components, engines, and devices.

The term "computing device" is both contemplated and to be understood to encompass any processor-based electronic device that is capable of executing processing instructions to provide specified functionality. Examples include desktop computers, laptop computers, tablet computers, server computers, multiprocessor systems, microprocessor-based systems, network PCs, minicomputers, and mainframe computers. Additional examples include programmable consumer electronics, appliances, especially so-called "smart" appliances such as televisions. Still other examples include devices that are wearable on the person of a user or carried by a user, such as cellphones, personal digital assistants (PDAs), smart watches, voice recorders, portable media players, handheld gaming consoles, navigation devices, physical activity trackers, and cameras. Yet another non-limiting example is a distributed computing environment that includes any of the above types of computers or devices, and/or the like.

The term "example" and the phrases "for example" and "such as" are to be understood to refer to non-limiting examples. Also, any example otherwise proffered in this detailed description are both intended and to be understood to be non-limiting.

The term "lookalike users" is both contemplated and to be understood to encompass users of other technology who share one or more traits with particular user. Lookalike users (and their associated data) are a way to leverage a smaller data set concerning a user to yield longer and/or wider baselines to reference. This is possible because lookalike users reflect or even share selected traits/characteristics with a reference set from a user. This makes extrapolations based on information corresponding to lookalike users pertinent. Also, the accuracy of inferences and deductions tends to increase with longer and/or wider baselines. Lookalike users (and their associated data) are identified via modelling.

The term "content" is both contemplated and to be understood to encompass myriad types of information and may take various forms including, media, news, and spoken word and computer generated information and or comprise one or more returned search results.

The term "user experience" is both contemplated and to be understood to encompass the overall experience of a person using a product, such as a website, device, or computer application or software. It focuses on understanding what users need, what they value, their abilities, and also their limitations. This phrase is sometimes measured by, for example, ease of use, effectiveness, utility, and how pleasing it is to use.

The term "infer" is both contemplated and to be understood to encompass deducing or otherwise reaching a conclusion based on evidence and reasoning rather than based on explicit statements.

The terms "a user's sensibilities," "user sensibilities," and "sensibilities" are both contemplated and to be understood to encompass and generally refer to, for example, a user's information (content) preferences, which are based on the user's belief structure(s). A belief structure, in turn, may be said to be built on and/or reflect a user's myriad emotional, intellectual, ethical, religious, and/or moral sensitivities that may be implicated when exposed to stimuli, such as responsive content. Such sensibilities reflect, for example, a user's individual morals, ethics, sensitivities, moods, cultural backgrounds, personality, sophistication, and politics.

The term "data" is both contemplated and to be understood to encompass both the singular and plural forms and uses.

The term "modulated data signal" is both contemplated and to be understood to encompass a signal that has one or more of its characteristics set or changed in such a manner as to encode information in the signal. By way of example, and not limitation, communication media includes wireless media such as acoustic, RF, infrared and other wireless media.

The term "communication media" is both contemplated and to be understood to encompass media that embody computer-readable instructions, data structures, program modules or other data in a modulated data signal such as a carrier wave.

The terms "computer program medium," "storage media," "computer-readable medium," and "computer-readable storage medium," as used herein, are both contemplated and to be understood to encompass memory devices or storage structures such as hard disks/hard disk drives, removable magnetic disks, removable optical disks, as well as other memory devices or storage structures such as flash memory cards, digital video disks, random access memories (RAMs), read only memories (ROM), and the like. Such computer-readable storage media are distinguished from and non-overlapping with communication media (do not include communication media).

The term "cloud" is both contemplated and to be understood to encompass a system that includes a collection of computing devices, which may be located centrally or distributed, that provide cloud-based services to various types of users and devices connected via a network, such as the Internet.

The Internet enables ever increasing opportunities to exchange information. It is used by, and will increasingly be used by, people of diverse cultural, socio-economic, and educational backgrounds. One consequence of this diverse user base is that, when searching on topics of interest, located information (responsive content) may be objectionable and/or offensive to some users. Indeed, even business areas contain language which some may find offensive or even indecent.

A complication associated with potentially objectionable content is that the line between what may be objectionable and what may not can vary in many ways, including: amongst different users; for a particular user; and/or depending on context. Also, it may vary based on the type of responsive content at issue. Additionally, some Internet users and parents, for example, desire to screen responsive content for content that they might regard as objectionable (i.e., inconsistent with their sensibilities).

Conventional digital personal assistants (i.e., digital personas) are programmed to make suggestions and/or provide responsive content based on general/generic factors, such as a user's location and/or static rules/rule-based decisions. They typically do not take into account individualized factors, such as a current context of use and a particular user's sensibilities (i.e., what the user may find offensive, improper, and or questionable, for example). This can lead to a sub-optimal user experience because responsive content is presented without regard to whether that content may be inconsistent with a user's sensibilities and/or in appropriate for a context.

In contrast to conventional digital personal assistants, the innovations described herein relate to a digital personal assistant that can deduce a context of use and can infer facets of the sensibilities of a particular user, based on a variety of signals. Then, it can use this individualized information to assist the user in a variety of ways that are consistent with the user's sensibilities. In more detail, innovations consistent with those described herein may infer (e.g., algorithmically derive) aspects or facets of a particular user's sensibilities concerning responsive content. It may also deduce (e.g., algorithmically derive) a context of use.

Generally, the digital personal assistant functionality disclosed herein provides a user interface by which a user can submit questions, commands/directives, and/or other input and by which responses to such input may be delivered/returned to the user in a manner tailored to comport his or her sensibilities (either inferred or provided) and to be appropriate for a context of use (either inferred or provided). Contemplated manners include: a "proactive subtractive" one in which portions of responsive content is presented to a user in a selectively modified form; a "proactive additive" one in which information is suggested/offered/presented to a user based on a need/desire/want/result inferred by the digital personal assistant functionality; and combinations thereof.

II. Illustrative Distributed Computing System

FIG. 1A is a block diagram of an example of a distributed computing system 100 that implements a digital personal assistant that tailors responsive outputs in a manner that is consistent with one or more embodiments of the present invention. As shown in FIG. 1A, the system 100 includes end user devices 102a-102e, which are each communicatively connected to a digital personal assistant backend 106 via network 104. The system also optionally includes one or more data stores 108.

Each illustrated end user device 102a-102e is a processor-based electronic device that is capable of executing a digital personal assistant 130 that is installed thereon. As FIG. 1A illustrates, the computing devices 102a-102e include, as illustrative examples, a general computing device 102a, a tablet computing device 102b, a mobile computing device 102c, a wearable computing device 102d, or a "smart" appliance 102e. It is to be understood, however, that the system 100 may include computing devices of a variety of other general purpose or special purpose computing hardware configurations, such as media devices.

The digital personal assistant 130 may be executed on behalf of a user of a respective one of the computing devices 102a-102e.

The network 104 interconnects the computing devices 102a-102e and the back end 106. The network 104 permits an avenue of communication between the end user devices 102a-102e and the digital personal assistant backend 106. The network 104 may be any type of network or combination of networks suitable for facilitating communication between end user computing devices, such as end user devices 102a-102e and digital personal assistant backend 106. Examples of network 104 include a wide area network, a local area network, a circuit-switched network, and a wired network. The network 104 may also be a wireless network, such as a wireless fidelity (Wi-Fi) network, an Internet protocol (IP)-based network, and a cellular network. Further, the network 104 may be public or private.

The illustrated personal assistant backend 106 includes one or more servers that are programmed to provide services in support of the operations of digital personal assistant 130. The backend 106 may also be programmed to provide services in support of the operations of other digital personal assistants executing on other end user computing devices (not shown). For example, as will be discussed herein, personal assistant backend 106 is configured to provide services to digital personal assistant 130 relating to inferring respective users' sensibilities, deducing one or more contexts of use, deciding whether responsive output (i.e., content) may not comport with a particular user's sensibilities, and tailoring the delivery of the responsive content so that it is more likely to comport with the particular user's sensibilities.

Additionally or alternatively, the digital personal assistant backend 106 may comprise a cloud-based backend in which any one of a large number of suitably-configured machines may be arbitrarily selected to render one or more desired services in support of digital personal assistant 130. Such a cloud-based implementation provides a reliable and scalable framework for providing backend services to digital personal assistants, such as digital personal assistant 130.

It is to be understood that, in the implementation illustrated by FIG. 1A, the aforementioned services are respectively provided by the backend 106 and that the digital personal assistant backend may perform any number of other services on behalf of digital personal assistant 130, although such additional services may not be explicitly described herein. It is also to be understood that in alternative implementations, at least some of the aforementioned services are respectively provided by the computing device 102 on behalf of digital personal assistant 130, although such additional services may not be explicitly described herein.

Figure 1B:
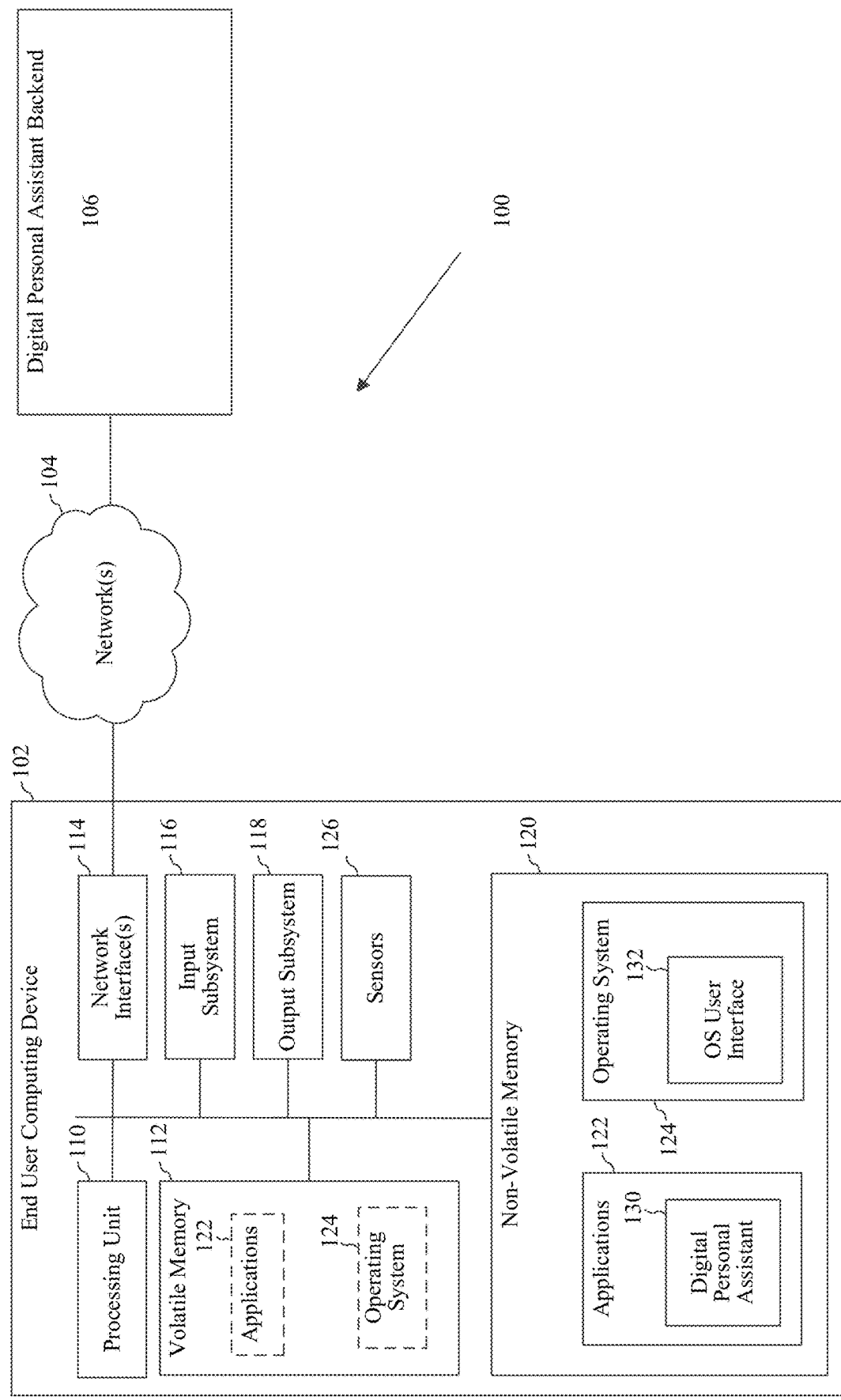
FIG. 1B is a block diagram illustrating an exemplary end user device usable with the distributed computing system of claim 1.

FIG. 1B is a block diagram of the distributed computing system of FIG. 1A, showing an end user device of the system of FIG. 1 in more detail. The end user device may be, for example, device 102a of FIG. 1.

As shown in FIG. 1B, the end user device 102 includes a plurality of interconnected components, including a processing unit 110, a volatile memory 112, one or more network interfaces 114, a user input subsystem 116, an output subsystem 118, and a non-volatile memory 120.

With concurrent reference to FIGS. 1A and 1B, the illustrated processing unit 110 includes one or more microprocessors, each of which may have one or more central processing units (CPUs) or microprocessor cores. The processing unit 110 executes computer programs (i.e., computer program logic). The execution of such computer programs causes the processing unit 110 to perform operations including digital personal assistant operations that will be described herein. Each of the non-volatile memory 120, the output subsystem 118, the user input subsystem 116, the network interface(s) 114, and the volatile memory 112 and may be connected to the processing unit 110 via one or more suitable interfaces.

The illustrated non-volatile memory 120 may include one or more computer-readable memory devices that operate to store computer programs and data in a persistent manner, such that stored information will not be lost even when the computing device 102 is without power or in a powered down state, for example. The non-volatile memory 120 may be implemented by, for example, read-only memory (ROM) devices, solid state drives, hard disk drives, magnetic storage media such as magnetic disks and associated drives, optical storage media such as optical disks and associated drives, and flash memory devices such as USB flash drives.

The illustrated volatile memory 112 includes one or more computer-readable memory devices that operate to store computer programs and data in a non-persistent manner, such that the stored information will be lost when end user device 102 is without power or in a powered down state, for example. Volatile memory 112 may be implemented by, for example, dynamic random access memory (DRAM) or other random access memory (RAM) devices.

The illustrated output subsystem 118 includes one or more devices through which responsive content, such as text and/or media, can be suitably delivered to the user so that the content may be consumed. The output subsystem 118 may be implemented by: a speaker, which is particularly useful to deliver responsive content with a sound element; a printer, which is particularly useful to deliver responsive content with a textual element; and a display, which is particularly useful to deliver responsive content with textual and/or visual element(s).

In the case of a display, for example, text and images can be rendered so that they will be visible to a user of end user device 102. Some or all of the rendering operations required to display such content may be performed at least in part by processing unit 110. Some or all of the rendering operations may also be performed by a display device interface such as a video or graphics chip or card (not shown in FIG. 1) that is coupled between processing unit 110 and the display. Depending upon the implementation of end user device 102, the display may comprise a device that is integrated within the same physical structure or housing as processing unit 110 or may comprise a monitor, projector, or other type of device that is physically separate from a structure or housing that includes processing unit 110 and connected thereto via a suitable wired and/or wireless connection.

The output subsystem 118 may also be a communications connection that allows the computing device 102 to deliver content to another device, such as a purpose-built device for specific content (e.g., a large television for visual content vs. a cellphone display), a communication medium. Some examples of communication media include wired media such as a wired network or direct-wired connection, and wireless media such as acoustic, RF, infrared and other wireless media. This implementation is particularly advantageous when the computing device 102 is a small appliance or wearable device.

In more detail, in an implementation where the computing device 102 is a wearable device, may be connected to one or more networks of other devices through wired or wireless communication arrangements. For example, when loaded with a "home" attribute set and corresponding CSes and CCs, the body-worn computing device 102 can make use of output devices in a smart room (e.g., a television and stereo when the user is at home), with the body-worn computing device 102 transmitting responsive content (already tailored) to those devices via a wireless medium or by way of a cabled or docking mechanism if available.

The illustrated user input subsystem 116 includes to comprise one or more devices that operate to receive user inputs via a user's manipulation or control thereof. The input subsystem 116 may be implemented by, for example, a touch screen (e.g., a touch screen that may be integrated with a display of user subsystem 118), a keyboard, a keypad, a mouse, a touch pad, a trackball, a joystick, a pointing stick, a wired glove, a motion tracking sensor, a game controller or gamepad, or a video capture device such as a camera. Other devices are both possible and contemplated, however. Also, the input subsystem 116 may be selectively included/provided based on the expected use environment and types of responsive content to be delivered, for example. Further, depending on the implementation, each user input interface of the user input subsystem 116 may be integrated within the same physical structure or housing as processing unit 110 (such as an integrated touch screen, touch pad, or keyboard on a mobile device) or physically separate from a physical structure or housing that includes processing unit 110 and connected thereto via a suitable wired and/or wireless connection.

In some contemplated implementations, the user input comprises user speech that is captured by one or more microphones of the user input subsystem of the end user device 102. The responses generated by a digital personal assistant 130 may be made visible to the user in the form of text, images, or other visual content shown on a display of the output subsystem 118. The responses may also comprise computer-generated speech or other audio content that is played back via one or more speakers of the output subsystem 118. Functions of the personal digital assistant 130 will be described in more detail herein.

Also, it is both possible and contemplated that at least some of the input subsystem 116 can be implemented as a natural user interface (NUI), which is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface.

User input information may be received via cooperation of one or more of the input device(s) of the user input subsystem 116. The user input information is passed via a suitable interface to the processing unit 110 for processing.

The sensor subsystem 126 may include one or more devices that detect or sense physical stimulus (such as motion, light, heat, sound, pressure, etc.) and generate a resulting signal (e.g., for measurement or control). Signals generated by the sensor subsystem 126 may be collected and processed by processing unit 110 or other logic within end user device 102 to support a variety of applications 122. In particular, the signals generated by the sensor subsystem 126 may be collected and processed by various logic shown in and explained with reference to FIG. 2 of the digital personal assistant backend 206 of FIG. 2. The functions of that logic are discussed below with reference to that FIG. 2.

It is both possible and contemplated that at least some of the device(s) of the user input subsystem 116 and at least some of the device(s) of the output subsystem 118 can be part of a housing that contains the various components of the computing device 102; can be separable from that housing and connected to the computing device 102 through various connection interfaces, such as a serial bus, wireless communication connection and the like; and can be separate from that housing and connected to the computing device 102 through various connection interfaces, such as a serial bus, wireless communication connection and the like.

Network interface(s) 114 may include one or more interfaces that enable the end user device 102 to communicate with, for example, the back end 106 over the network 104.

As further shown in FIG. 1B, non-volatile memory 120 stores a number of software components including one or more applications 122 and an operating system 124.

Each of the one or more applications 122 comprises a computer program or processing instructions that a user of end user device 102 may cause to be executed by processing unit 110. The execution of each application causes certain operations to be performed on behalf of the user, wherein the type of operations performed will vary depending upon how the application is programmed. Examples of the applications 122 may include, for example, a telephony application, a directory/reference application, an e-mail application, a messaging application, a Web browsing application, a calendar application, a utility application, a game application, a social networking application, a music application, a productivity application, a lifestyle application, a reference application, a travel application, a sports application, a navigation application, a healthcare and fitness application, a news application, a photography application, a finance application, a business application, an education application, a weather application, a books application, and/or a medical application.

As shown in FIG. 1B, applications 122 include the digital personal assistant 130, functions of which will be described in more detail herein.

Applications 122 may be distributed to and/or installed on end user device 102 in a variety of ways, depending upon the implementation. For example, in one contemplated implementation, at least one of the applications 122 may be downloaded from an application store and installed on end user device 102. In another contemplated implementation, in which end user device 102 is utilized as part of or in conjunction with an enterprise network, at least one of the applications 122 is distributed to end user device 102 by a system administrator using any of a variety of enterprise network management tools and then installed thereon. In yet another contemplated implementation, at least one of the applications 122 is installed on end user device 102 by a system builder, such as by an original equipment manufacturer (OEM) or embedded device manufacturer, using any of a variety of suitable system builder utilities. In still another contemplated implementation, an operating system manufacturer may include one or more of the applications 122 along with operating system 124 that is installed on end user device 102.

Operating system 124 comprises a set of instructions or even programs that manage resources and provide common services for applications that are executed on end user device 102, such as applications 122. Among other features, the operating system 124 may provide an operating system (OS) user interface 132. One example of the OS user interface 132 may include a component of operating system 124 that generates a user interface by which a user can interact with operating system 124 for various purposes, such as finding and launching applications, invoking certain operating system functionality, and setting certain operating system settings. In one contemplated implementation, the OS user interface 132 comprises a touch-screen based graphical user interface (GUI). In further accordance with such an example, one or more of the applications 122 installed on end user device 102 may be represented as an icon or tile within the GUI and invoked by a user through touch-screen interaction with the appropriate icon or tile. Here, the touchscreen would be included in the input subsystem 116. It is both possible and contemplated that the OS user interface 132 may reflect alternative user interface models.

Although applications 122 and operating system 124 are shown as being stored in non-volatile memory 124, it is to be understood that during operation of end user device 102, copies of applications 122, the operating system 124, or portions of either or both of the applications and the operating system, may be loaded to volatile memory 112 and executed therefrom as processes by processing unit 110.

In one contemplated implementation, the system 100 may receive various inputs and detect various information for a particular user from different ones of the end user devices 102a-102e. This scenario might commonly occur in a household environment where a particular user moves from room to room and interacts with the system 100 via various devices.

III. Illustrative User Experience Enhancement System

Figure 2:
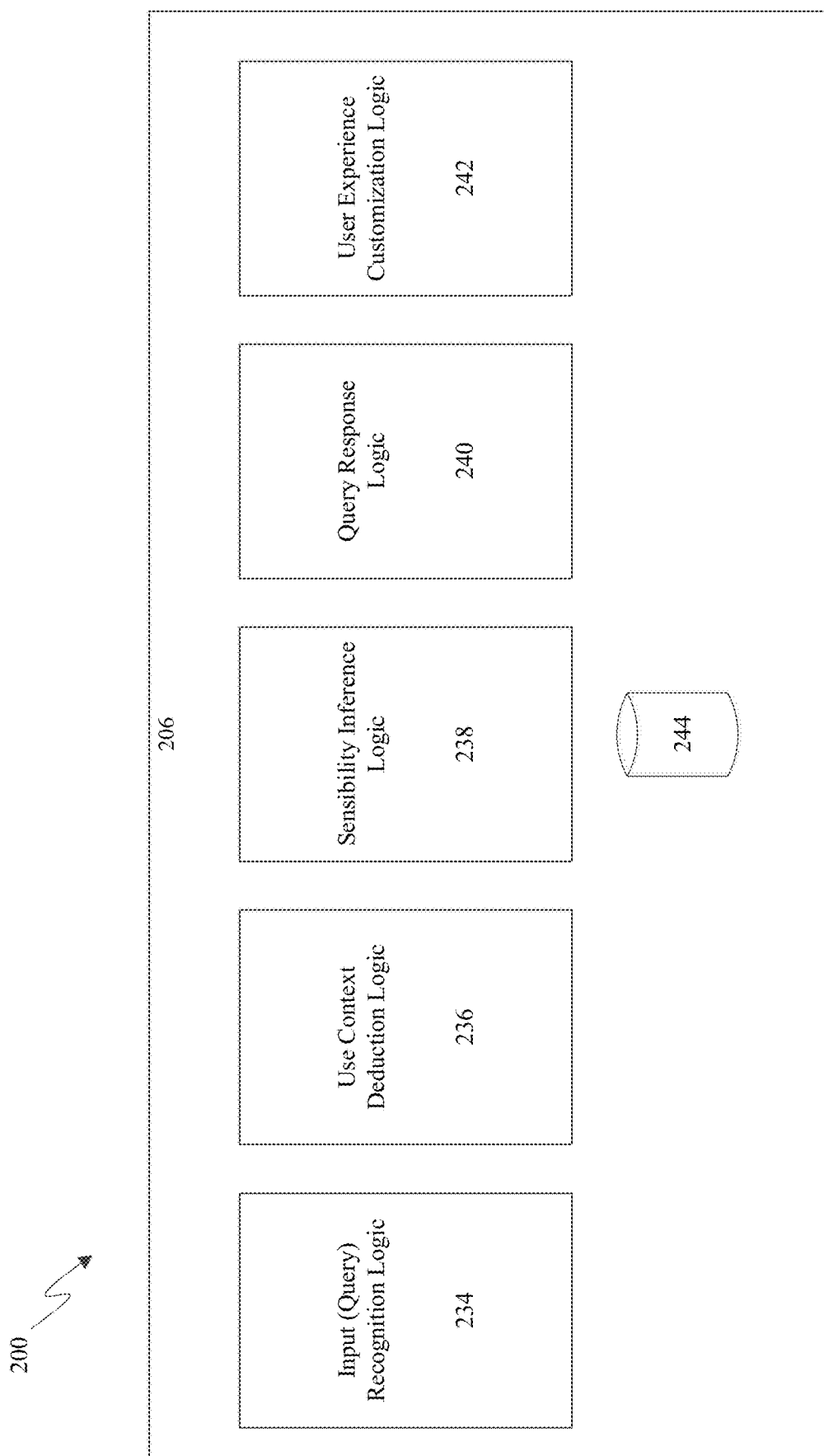
FIG. 2 is a block diagram of an exemplary digital personal assistant backend that may be implemented by the digital assistant of FIGS. 1A and 1B.

As FIGS. 1A and 1B show, the computer program or processing instructions that provide the personal digital assistant 130 of this invention may be an application. It is to be understood, however, that the computer program or processing instructions that provide the personal digital assistant 130 may reside in the back end 106. This alternative configuration is illustrated in FIG. 2 and is discussed below with reference to that figure.

With continued reference to FIGS. 1A and 1B, the operating system 124 includes one or more sets of programs or processing instructions that manage resources and provide common services for applications 122 that are executed on the end user device 102, such as the applications 122. Although the applications 122 and the operating system 124 are shown as being stored in the non-volatile memory 120, it is to be understood that during operation of the end user device 102, the applications 122, the operating system 124, or portions thereof, may be loaded to the volatile memory 112 and executed therefrom by the processing unit 110.

The digital personal assistant 130 comprises a computer program or processing instructions that is/are configured to perform tasks, or services, for a user of the end user device 102 based on user input as well as features such as location awareness and the ability to access information (such as weather or traffic conditions, news, stock prices, user schedules, retail prices, etc.) from a variety of sources including online sources. Examples of tasks that may be performed by digital personal assistant 130 on behalf of the user include placing a phone call to a user-specified person, launching a user-specified application, sending a user-specified e-mail or text message to a user-specified recipient, playing user-specified music, scheduling a meeting or other event on a user calendar, obtaining directions to a user-specified location, obtaining a score associated with a user-specified sporting event, posting user-specified content to a social media web site or microblogging service, recording user-specified reminders or notes, obtaining a weather report, obtaining the current time, setting an alarm at a user-specified time, obtaining a stock price for a user-specified company, finding a nearby commercial establishment, performing an Internet search, or the like.

Generally, the digital personal assistant 130 is configured to provide a user interface by which a user can submit questions, commands, or other input and by which responses to such input may be delivered to the user in a manner tailored to his or her sensibilities, either inferred or provided. Stated differently, The digital personal assistant 130 can determine information about user's sensibilities relating to responsive content of a particular (i.e., current) user of end user device 102 by analyzing one or more signals associated with the user, information associated with or reflective of the user, and a context of use.

Referring to FIG. 2, there is illustrated user experience enhancement system 200 with a digital personal assistant backend 206 that may be implemented by digital personal assistant 130 of FIGS. 1A and 1B, alone or in conjunction with other applications or services executing on or accessible to end user device 102 of FIG. 1B.

The digital assistant backend 206 includes query recognition logic 234, use context deduction logic 236, sensibility inference logic 238, query response logic 240, user experience customization (presentation tailoring) logic 242, and an optional one or more data stores 244. These components and/or services enable the personal assistant backend 206 to perform any number of other services on behalf of digital personal assistant 130, although such additional services may not be explicitly described herein.

The backend 206 may comprise part of digital personal assistant 130 of FIGS. 1A and 1B or an application or service that is accessible to digital personal assistant 130, such as one of the applications 122 of FIG. 1B. Also, as can be appreciated, one or more of the elements of logic of the backend is/are operable to identify the user. For example, the input recognition logic 234 and the sensibility inference logic 238 may make such indications.

The query recognition logic 234 is operable to provide services to a digital personal assistant (e.g., digital assistant 130 of FIG. 1B) relating to query understanding. Such queries may be received in various forms including speech, keystroke, and/or visual. It is contemplated that many queries to the digital personal assistant 130, if not a majority, will be in the form of speech. Accordingly, this logic 234 is described herein in the context of a speech recognition. It is to be understood, however, that other forms of input (i.e., queries or directives) are both possible and contemplated.

More specifically, many queries will likely be in the form of natural language. In this case, logic 234 would perform speech recognition in which raw speech data may be provided to logic 234 for identification of recognized speech segments, which can be parsed and used to formulate a search for content responsive to the received query.

It is contemplated that this logic 234 may operate in various listening states. One contemplated state is an active listening state, for example, in which the logic may receive and analyze detected speech to determine corresponding actions to take on a computing device. Here, the received speech could be signals from a microphone (not shown) of the input subsystem 116 of FIG. 1B. It is also contemplated that logic 234 may, at times, operate in a restricted or passive listening state in which the system 200 waits for a signal from, for example input subsystem 116, which is then used as a trigger to wake up and enter an active listening state. Still further, it is contemplated that the various listening states may correspond to different contexts of use.

It is contemplated that this logic 234 may perform various operations in the process of speech receipt and recognition. For example, it is both possible and contemplated that the query recognition logic 234 may: perform normalization and/or feature extraction functions on received digitized speech signals to obtain intermediate speech recognition results; perform filtering that may, for example, enhance the fidelity and understanding of the received audible query; and or perform additional speech processing, (e.g., natural language analysis, intent determination, and/or disambiguation of ambiguous speech inputs). In another contemplated implementation, the logic 234 may communicate with an external speech recognition service (not shown) to assist with the speech recognition process.

Logic 234 operates to receive the audio stream transmitted thereto by digital personal assistant 130 and to analyze the audio stream to determine the phonetic content thereof.

Once logic 234 has determined the phonetic content of the audio stream, it passes the recognized utterance to query response logic 240.

Use context deduction logic 236 is operable to provide services to a digital personal assistant (e.g., digital assistant 130 of FIG. 1B) relating to deduction of a context of use of the digital personal assistant 130. Stated differently, logic 236 determines a context in which the digital personal assistant 130 is presently being used. In one contemplated implementation, this context is shared by those of one or more of end user device 102a-102e of FIG. 1A. As can be appreciated, context can play an important role with respect to understanding the meaning associated with a particular input, an intent of a user, and/or how responsive content may best be provided to the user.

For example, a context of use may assist in interpreting uttered words that sound the same (e.g., homonyms). Also, context of use may provide an enhanced ability to correctly identify content responsive to a received query (versus reliance only on parsed search terms).

The use content deduction logic 236 may be operable to deduce a context of use based on various received signals, including signals relating to: a local time; a geographic location; physical location; a surrounding environment; and/or the nearby presence and/or absence of other persons. It is to be appreciated that these examples of context may be relative to the user of the digital personal assistant 130 and/or to an end user device (e.g., 102 of FIG. 1B).

In more detail, the context deduction logic 236, using various input information, can provide context information in a variety of ways. For example, user input information alone can provide significant information about the user's context. If the user is currently supplying input to the computer via a full-sized keyboard, for instance, it is likely that the user is engaged in little other physical activity (e.g., walking), that the user is devoting a significant amount of attention to the computer system, and that the user would see information conveyed by a display. Alternatively, for example, if the user is generating user audible input (e.g., through a microphone or other component of the user input subsystem 116 of FIG. 1B), that fact may provide less user context information since the user can supply such audio information while engaged in a variety of types of physical activity.

In addition to information related directly to the user, the use context deduction logic may also receive and use information related to the environment surrounding the user. For example, devices such as microphones or motion sensors (included in input subsystem 216 and/or sensor subsystem 126 of the end user device 102 of FIG. 1B may be able to detect whether there are other people near the user and whether the user is interacting with those people. Sensors can also detect environmental conditions which may affect the user, such as air thermometers. Sensors, either body-mounted or remote, can also provide information related to a wide variety of user and environmental factors including location, orientation, speed, direction, distance, and proximity to other locations (e.g., GPS and differential GPS devices, orientation tracking devices, etc.). Remote sensors (e.g., home or car alarm systems, remote camera, national weather service web page, a baby monitor, traffic sensors, etc.) can also provide relevant environment information. All of the above items of information may be used to generate attribute values by logic 236.

The use context deduction logic 236 may also receive signals reflecting explicit user supplied information about their current context via the input subsystem 116 of FIG. 1B, for example. Logic 236 may also receive current date and time information in order to both track changes over time and to utilize information such as the user's stored schedule. Previously-created models of the user's context can also be retrieved e.g., from the one or more data stores 244) and used as a default or to detect changing conditions.

It is also contemplated that this logic 236 may also be operable to deduce a context of use based on the type of the end user device by which the digital personal assistant 130 is provided to the user. For example, a smart refrigerator would be inclined to deduce that it is in a kitchen. For example, a body worn device could be more inclined to deduce a context of use that is outside of a home or office.

Furthermore, it is contemplated that this logic 236 may make deductions based at least in part, on aggregated search engine data or the like. As can be appreciated, the type(s) of responsive content presented in similar contexts of use can be most informative in a current circumstance by offering one or more baselines of information (i.e., patterns) to reference, for example. Additionally, or alternatively, it is both possible and contemplated that information from the end user device (e.g., 102 of FIG. 1B) indicating the types of output currently being presented to the user can also provide information about the user's current context of use. \

By reviewing user's past and/or current content consumption choices, patterns showing user information preferences may advantageously be deduced without direct user participation. Also, by tracking the types of content the user chooses, appropriate content can be gathered on their behalf. Sensibility inference logic 238 is operable to provide services to a digital personal assistant (e.g., digital assistant 130 of FIG. 1B) relating to inferring aspects/facets of a particular user's sensibilities as they relate to responsive content retrieved from, for example, the Internet by a search engine. User experience logic 238 synthesizes (i.e., models) the user's sensibilities as they relate to content. Stated differently, logic 238 is operable to infer items of information (i.e., aspects or facets) about a user's sensibilities based on: observed activities of the user (e.g., past consumption of the same or similar content); aggregated search engine data concerning "lookalike users;" and/or one or more signals associated with a user of end user device (e.g., 102 of FIG. 1B). These respective bases are discussed in more detail below.

By reviewing user's past and/or current content consumption choices, patterns showing user information preferences may advantageously be deduced without direct user participation. Also, by tracking the types of content the user chooses, appropriate content can be gathered on their behalf.

The sensibility inference logic 238 may also be operable to make inferences using stored information about the user obtained from the one or more data stores 244, for example. Such information may include information about the user that changes at most infrequently, although it is possible to frequently update the stored background information to reflect changing conditions. For example, background information about the user can include demographic information (e.g., race, gender, age, religion, birthday, etc.) if it can affect when and how context information is created and used. User preferences, either explicitly supplied or learned by the system, can also be stored as background information. Information about the user's ethics or morality or culture or background which affects the type of information which the user wishes to consume that allows systems with access to this information to adapt to the user's sensibilities and to produce a more optimal user experience by tailoring the presentation of responsive content in a manner that is at least more likely to be consistent with the user's sensibilities. Also, it is contemplated that logic 238 may also be operable to make inferences based on past user actions, such as whether the user has consumed the same or similar content.

In a contemplated implementation, sensibility inference logic 238 is operable to store resolved aspects of the user's sensibility as part of a user profile associated with that user. The user profile may be stored locally in the one or more data stores 244 or remotely (not shown). Also, in a contemplated implementation, the sensibility inference logic 238 may be operable to make inferences using stored information aggregated by a search engine provider. This information could, for example, reflect how others, who share characteristics with the user, consumed similar content. More specifically, it is contemplated that logic 238 may use aggregated search engine data for "lookalike users" who share characteristics with the identified user.

It is also contemplated that sensibility inference logic 238 may also be operable to make inferences based on the type of the end user device by which the digital personal assistant 130 is provided to the user. For example, a body worn device might imply that a smart refrigerator would be inclined to deduce that it is in a kitchen. Furthermore, it is contemplated that this logic 236 may make deductions based at least in part, on aggregated search engine data or the like. As can be appreciated, the type(s) of responsive content presented in similar contexts of use can be most informative in a current circumstance by offering one or more baselines of information (i.e., patterns) to reference, for example.

Logic 238 may be operable to build inferences based on any of a wide variety of signals that may be obtained, for example, from user computing device 102, or from other sources. For example, sensibility inference logic 238 may infer items of information about a user based on activities performed by the user when using user computing device 102 (e.g., launching and/or using a particular application or service, making a phone call, scheduling an event on a calendar, sending, posting or otherwise sharing a message or other content, obtaining a service from or otherwise interacting with digital personal assistant 130, conducting an Internet search, or the like) and/or based on location data or sensor data obtained from user computing device 102. Logic 238 may use still other types of signals to infer items of information about a user, including but not limited to a user's activities with respect to one or more devices other than user computing device 102. Here, it is to be appreciated that these signal(s) may comprise, for example, any of the described signals identified as being helpful in determining a user's sensibilities as described herein.

Query response logic 240 is operable to provide services to a digital personal assistant (e.g., digital assistant 130 of FIG. 1B) relating to identifying content responsive to a identifying and/or collecting content responsive to a query received by query recognition logic 234, for example.

In more detail, query response logic 240 receives the recognized utterance from logic 234 and analyzes the words thereof to determine how such utterance should be handled thereby. For example, query response logic may determine that the recognized utterance comprises an invocation of a particular task within a predefined set of tasks. In that case, logic 240 would oversee the execution of a search by one or more search engines (not shown). Thereafter, it would aggregate results returned in response to the search, which could comprise responsive content. Logic 240 would then deliver the responsive content to the presentation tailoring logic 242.

The presentation tailoring logic 242 is operable to provide services to a digital personal assistant (e.g., digital assistant 130 of FIG. 1B) relating to resolving or otherwise formulating strategies (i.e., ways) to tailor the presentation of responsive content (from logic 242) so that the presentation is at least more likely to be consistent with a deduced context of use (from logic 236) and the inferred aspects of the user's sensibilities (from logic 238), which promotes a more optimal user experience. Accordingly, logic 242 receives inputs from the query recognition logic 234, use context deduction logic 236, and sensibility inference logic 238, query response logic 240, as well as other signals that may inform logic 242 that may be includable in the resolving/formulating by logic 242.

In one contemplated implementation, logic 242 may synthesize a user experience model that informs the digital personal assistant as to how to tailor (i.e., modify or customize) the presentation of responsive content so as to be consistent with the user's sensibilities. In this way, logic 242 is configured to receive inferred facets/aspects of a user's sensibilities from sensibility logic 238 and to leverage that information to generate one or more strategies to selectively modify the presentation of responsive content so that it is more likely to be consistent with the user's sensibilities.

Logic 242 may be operable to resolve strategies to tailor the presentation of content based on, for example, previously used strategies, strategies used by "lookalike" users based on aggregated search engine data, and/or applying one or more rules.

It is contemplated that the presentation tailoring logic 242 may tailor the presentation of responsive content in any number of ways, including:

(1) changing the content presented to the user;
(2) changing the format of the content presented to the user;
(3) changing the mode or method by which the user interacts with the computer,
(4) reorganizing the presentation based on user indication or context model;
(5) deferring its presentation based on user indication or context modeling; and/or
(6) replacing the responsive content with equivalent responsive content.

The presentation tailoring logic 242 may also be configured to recommend to a user how to modify a particular item of responsive content to adjust the presentation so that it is deemed appropriate by the user (i.e., it comports with the user's sensibilities). Additionally, or alternatively, the presentation tailoring logic 242 may be operable to employ stored and/or aggregated information concerning the user and/or "lookalike users."

As explained above, logic 242 may be operable to resolve strategies to tailor the presentation of content. Thus, the strategies discussed herein are applicable to "proactive additive" implementations where, for example, a digital personal assistant or digital personal assistant functionality suggests content to the user. In that type of contemplated scenario, the strategies would be used to tailor how the suggested content would be presented so as to comport with a user's sensibilities and a context of use.

IV. Illustrative Method of Selectively Tailoring Presentation of Content

Figure 3:
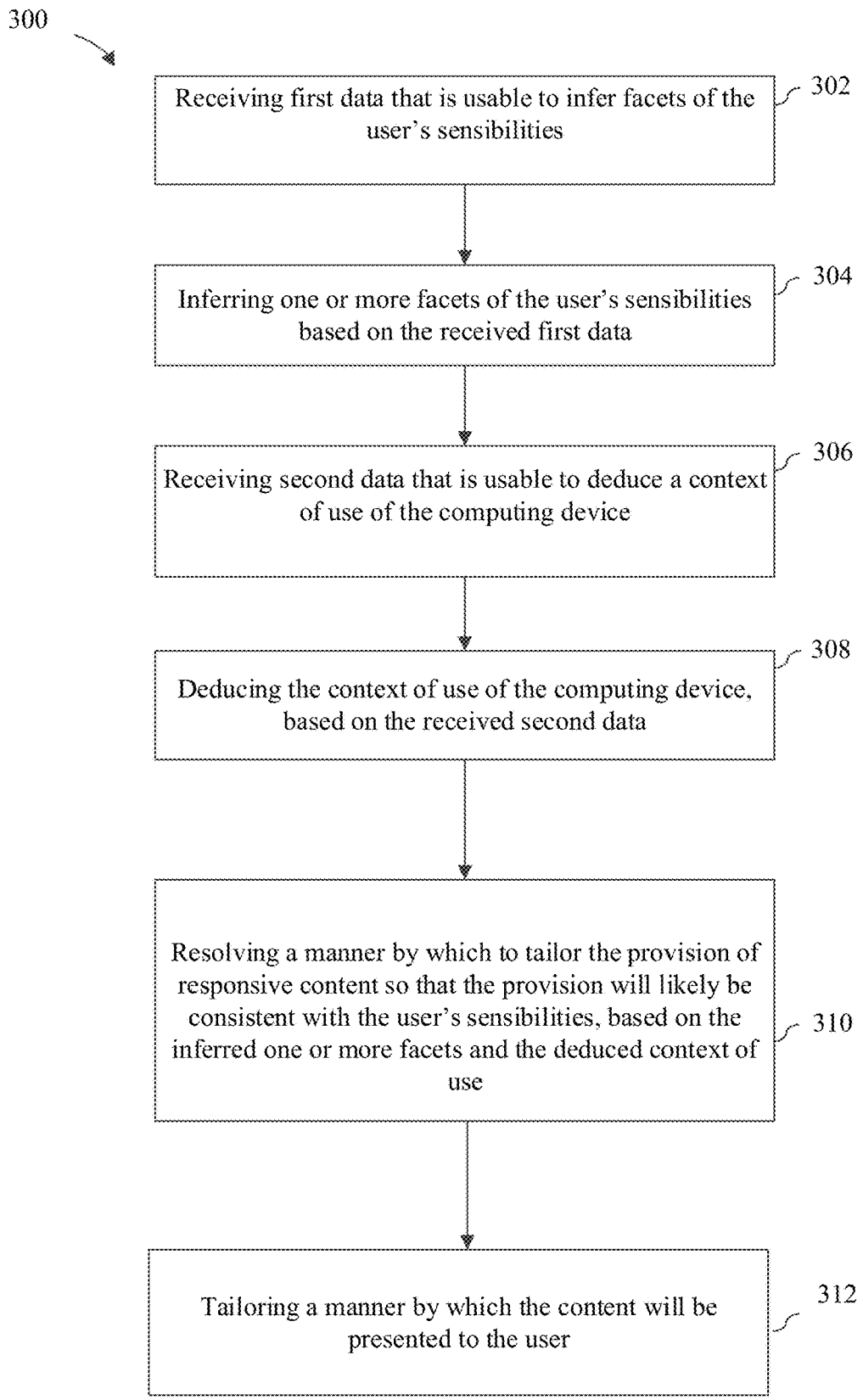
FIG. 3 is a flowchart illustrating a method of tailoring a provision of responsive content from a computing device in a manner that is consistent with one or more embodiments of the present invention.

To help further illustrate functionality of user experience enhancement system 200 of FIG. 2, as well as the foregoing techniques, additional reference is now made to FIG. 3. FIG. 3 illustrates flowchart depicting a method 300 of selectively tailoring a presentation of content, in a manner that is consistent with one or more embodiments of the present invention. By the method 300, responsive output may be presented to a user in a selectively modified manner that is at least more likely to comport with the user's sensibilities and current context of use.

Method 300 may be executed as part of digital personal assistant functionality, such as digital personal assistant 130 of FIG. 1B and will be described below with continued reference to components of systems 100 and 200 of FIGS. 1A-2. Solely for efficiency and clarity, the method 300 will be described below with continued reference to various components and/or arrangements of the systems 100 of FIGS. 1A and 1B, along with those of system 200 of FIG. 2. It is both possible and contemplated that method 300 may be achieved by systems of other configurations and/or components, however.

At reference numeral 302, data usable to infer facets of a user's sensibilities is received. In one contemplated implementation, this information comprises aggregated search engine data corresponding to "lookalike users" who are identified based on one or more traits of the user. Additionally, or alternatively, this data may be included in an obtainable user profile corresponding to the user and stored in the one or more data store 244 of FIG. 2.

At reference numeral 304, one or more facets/aspects of the user's sensibilities is/are inferred. As explained herein, these inferred facets are usable to inform about the user's actual sensibilities, as represented by the inferred facts. This operation may be realized by the participation of logic such as sensibility inference logic 238 of FIG. 2.

At reference numeral 306, data usable to deduce a context of use is received. This context is typically a current/present context of use of, for example, an end user device 102 of FIG. 1B. In one contemplated implementation, this data comprises aggregated search engine data corresponding to "lookalike users" who are identified based on one or more traits of the user. Additionally, or alternatively, this data may be included in a user profile corresponding to the user and stored in the one or more data store 244 of FIG. 2.

At reference numeral 308, a context of use is deduced based on the information received in operation 306. Here, it is to be appreciated that aspects to content presentation may be associated with a particular context of use and that those aspects can be used to craft a strategy for the presentation of content that will likely enhance a user's experience. This operation may be realized by the participation of logic such as use context deduction logic 236 of FIG. 2.

In one contemplated implementation, this operation 308 may include matching the deduced context of use to one or more stored contexts of use to each of which is associated data that is usable in the resolving of operation 310.

At reference numeral 310, a manner (i.e., a strategy or approach) by which the provision of responsive content may be tailored so that the provision will likely be (1) consistent with the user's sensibilities, and (2) the deduced context of use. It is to be appreciated that the resolved strategy may vary with each user, with each context of use, and for each type of responsive content, for example. Additionally, or alternatively, the resolved strategy may vary based on other factors such as a type of end user device (e.g., 102 of FIG. 1A) that may be employed to present the resolved content to the user. Examples of the implementations of various strategies for modifying (i.e., tailoring) the presentation of responsive content, in manners consistent with one or more embodiments of the present invention, are explained with reference to FIG. 4.

This operation 310 may include evaluation of the the responsive content and making a determination as to whether to present the responsive content with tailoring or without tailoring. This determination may be based on whether presentation of the responsive output without tailoring might be inconsistent with a user's sensibilities. One factor that may be considered would be historical reactions to the same and/or similar content.

In one contemplated implantation, the manner may be identified, at least in part, by at least one of: logic 242's considering of data, the application of one or more rules, identifying and obtaining it from one or more data stores, such as data store 108 of FIG. 1 or data store 248 of FIG. 2) for example.

When logic 242 participates in the resolution of the manner, it may receive information (e.g., signals) from any of the components of logic illustrated in FIG. 2, the components of system 100 of FIGS. 1A and 1B, and/or from an external source (not shown). One contemplated example of the type of information used by logic 242 is aggregated search engine data corresponding to lookalike users. Here, it is to appreciate that these signal(s) may comprise, for example, any of the described signals identified as being helpful in determining how to tailor the presentation of content.

It is both possible and contemplated that rules usable in this operation 310 may be obtained from a data store, read from a memory of the end user device, and/or supplied from external logic via a network, such as network 104 of FIGS. 1A and 1B.

In one contemplated implementation, operation 310 may include resolving more than one manner by which to tailor the presentation/provision of responsive content, scoring at least some of the resolved manners, and then selecting one of the scored resolved manners based on its score or distance from a specified threshold.

At reference numeral 312, the responsive content is presented to the user in a tailored manner (i.e., presented in a manner to which the tailoring parameters are applied). This operation may be realized by the participation of logic that may be either separate from or included with any of the logic illustrated in FIG. 2. Additionally, or alternatively, logic not included in the system 200 and/or in the backend 206 may at least participate in this operation.

Figure 4:
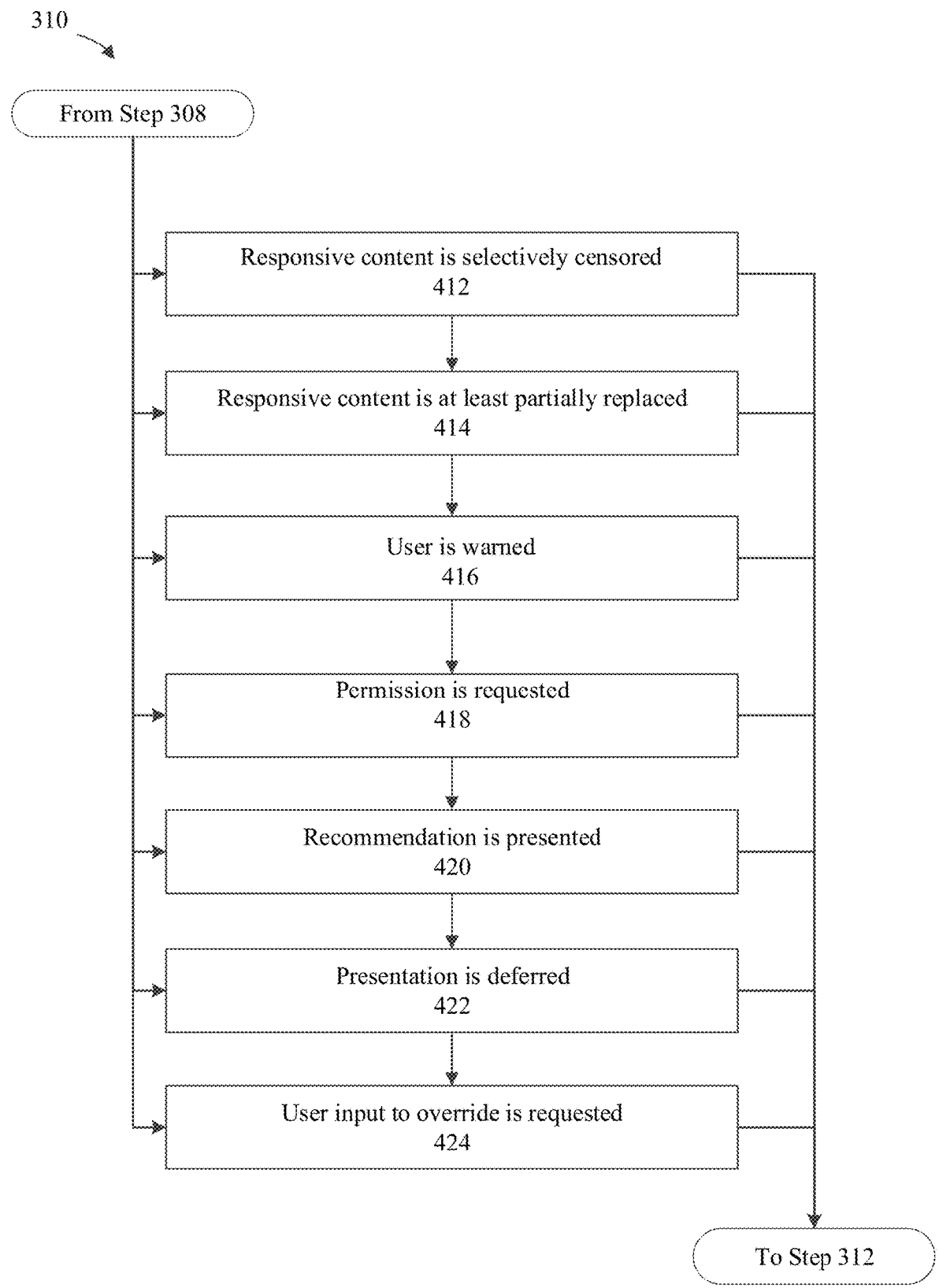
FIG. 4 is a flowchart illustrating operation 310 of the method illustrated by FIG. 3.

Referring now to FIG. 4, flowchart 400 illustrates various examples of the selective formatting/censoring/tailoring resulting from operation 310 of FIG. 3. Operation 310 may comprise one or more of the example operations illustrated by flowchart 400.

At reference numeral 412, the responsive content may be selectively censored and presented. For example, when the responsive content includes visual media, that content may be presented with a mosaic, a censor bar, or reformatted so as to obfuscate the potentially offending portion(s). When the responsive content includes audible media, the content may be presented with the potentially offending portion(s) bleeped, dropped, or replaced with a selected "dummy" word. Still further, when the content is textual, the potentially offending portions may be skipped or blacked out.

At reference numeral 414, the responsive content is partially or completely replaced with substantially similar content. In one exemplary implementation, this operation may include executing a second (or another) search for second search results. So, for example, in the case of audio media, a radio friendly edit of a song without offensive lyrics might be returned. In the case of textual media, alternatively authored and/or sourced content may be found and presented.

At reference numeral 416, a warning may precede the presentation of the responsive content. This warning may be a sound, speech, a graphic and/or other appropriate and effective mode of communicating the warning.

At reference numeral 418, a request for permission from the user to present the responsive content may be provided. Additionally, or alternatively, presentation of the responsive content may be deferred until permission is received from the user.

At reference numeral 420, a recommendation for or against presentation of the responsive content may precede presentation. Additionally, or alternatively, presentation of the responsive content may be deferred for a specified time interval so that the user may respond to the recommendation.

At reference numeral 422, presentation of the responsive content may be deferred.

At reference numeral 424, a user input to override tailoring the presentation of the responsive content may be requested and/or received.

V. Illustrative Method of Tailoring Provision of Content

Figure 5:
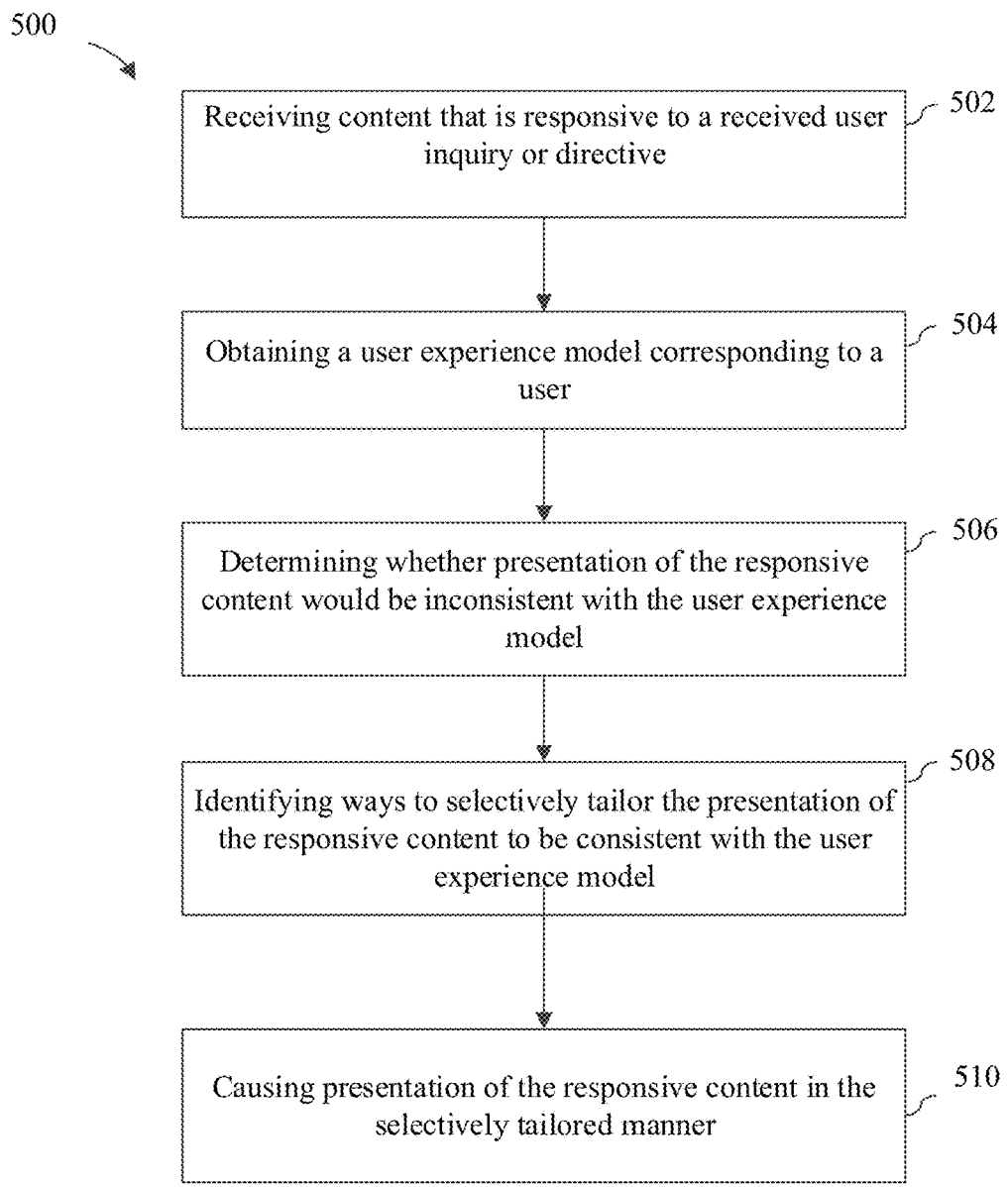
FIG. 5 is a flowchart illustrating a method of providing responsive content from a computing device in a selectively tailored manner that is unlikely to violate user's sensibilities and that is consistent with a detected context of use, in a manner that is consistent with one or more embodiments of the present invention.

The foregoing techniques may be further understood with reference to flowchart of method 500 of FIG. 5. In particular, FIG. 5 illustrates a method 500 by which a digital personal assistant or other automated component(s) may operate to provide responsive output that is consistent with a user's sensibilities and a context of use. It is both possible and contemplated that this output may take various forms including, media, news, and spoken word and computer generated information and/or comprise one or more returned search results.

The method of flowchart 500 will now be described with continued reference to system 200 as described above in reference to FIG. 2, although the method is not limited to that system.

At reference numeral 502, content that is responsive to a received user inquiry or directive is received. This content, in a general sense, may be characterized as information to be presented to the user. It is contemplated that this content will typically be one or more search results returned by a search engine in response to a search inquiry or directive. It may, however, be information that the digital personal assistant 206 infers a user might wish to receive (i.e., a suggestion). This content may be presented, for example, audibly (a specified song may be played), visually (a responsive image may be displayed), and/or haptically (a vibration or tone may be generated). This operation may be realized by the participation of logic such as query response logic 240 of FIG. 2.

At reference numeral 504, a user experience model, which corresponds to the user, is obtained. This model, in a general sense, includes information that is usable to tailor the presentation of responsive content. More specifically, the model informs as to factors that will dictate whether an item of responsive content would be deemed objectionable (i.e., offensive or otherwise inappropriate). This likelihood may be based on scoring, the application of rules, and/or extrapolation from actions taken by others who share qualities, interests, and/or demographics with the user (i.e., lookalike users). It is possible and contemplated that information about lookalike users may be obtained from aggregated search engine data.

The obtained user experience model, in a general sense, includes information that is usable to tailor the presentation of responsive content. More specifically, the model informs as to factors that will dictate whether an item of responsive content would be deemed objectionable (i.e., offensive or otherwise inappropriate). This likelihood may be based on scoring, the application of rules, and/or extrapolation from actions taken by others who share qualities, interests, and/or demographics with the user (i.e., lookalike users). It is possible and contemplated that information about lookalike users may be obtained from aggregated search engine data.

In more detail, the received user experience model is a synthesis of two primary factors. The first is a deduced context of use. The second is an inference of a user's sensibilities. Either or both of these factors may be based on received signals, the application of rules, and/or extrapolation from aggregated data from "lookalike users." It is both possible and contemplated that information about lookalike users may be obtained from aggregated search engine data, as discussed herein.

The user experience model may be synthesized by logic, such as presentation tailoring logic 242 of FIG. 2, or it may be obtained from a data store, such as data store 244. The deduced context of use may be provided by logic such as use context deduction logic 236. The inferred user sensibility may be provided by logic such as sensibility inference logic 238 of FIG. 2.

At reference numeral 506, the responsive content is evaluated with respect to the user experience model. In this operation, a determination is made as to whether to present the responsive content without tailoring. This determination is based on whether presentation of the responsive output without tailoring might be inconsistent with a user's sensibilities. In more detail, a user's sensibilities, inferred when the user experience model was generated, are compared to the responsive content. In addition, a deduced context of use is factored into this comparison. In this way, a user's sensitivities to certain content are factored into how the responsive content is presented, along with a context in which the content would be presented. The determination may be based on scoring, the application of rules, and/or extrapolation from actions taken by others who share qualities, interests, and/or demographics with the user (i.e., lookalike users). It is possible and contemplated that information about lookalike users may be obtained from aggregated search engine data. This operation may be realized by the participation of logic such as presentation tailoring logic 242 of FIG. 2.

At reference numeral 508, if a result of stage 506 is negative (i.e., presentation of the responsive content without tailoring would likely not be consistent with a user's sensibilities), ways to tailor (e.g., selective censoring or selective formatting) the provision of the responsive content to not offend a user's sensibilities are identified. Stated differently, strategies or ways of formatting the presentation (i.e., output) of responsive content so that it is appropriate (i.e., consistent with the user's sensibilities) and the context of use is resolved. It is to be appreciated that the formatting of the output of information will vary with each user, as well as with the context of use. Examples of the implementations of various strategies for this formatting (i.e., tailoring) of the presentation of responsive content, in manners consistent with one or more embodiments of the present invention, are explained with reference to FIG. 6. The strategies may be obtained from a data store, for example.

It is contemplated that this process may be based on static rules (e.g., a rules table) or dynamic (e.g., intuitive algorithm based), or a combination of these approaches. This operation may be realized by the participation of logic such as presentation tailoring logic 242 of FIG. 2.

At reference numeral 510, the responsive content is presented to the user in a tailored manner (i.e., selectively formatted with the tailoring parameters applied). This operation may be realized by the participation of logic such as presentation tailoring logic 242 of FIG. 2. Here, it is contemplated that this customization may include applying the one or more tailoring factors described herein to adjust the delivery of information to the user, so as to tailor the experience to the user's sensibilities and context in which the device is used.

Figure 6:
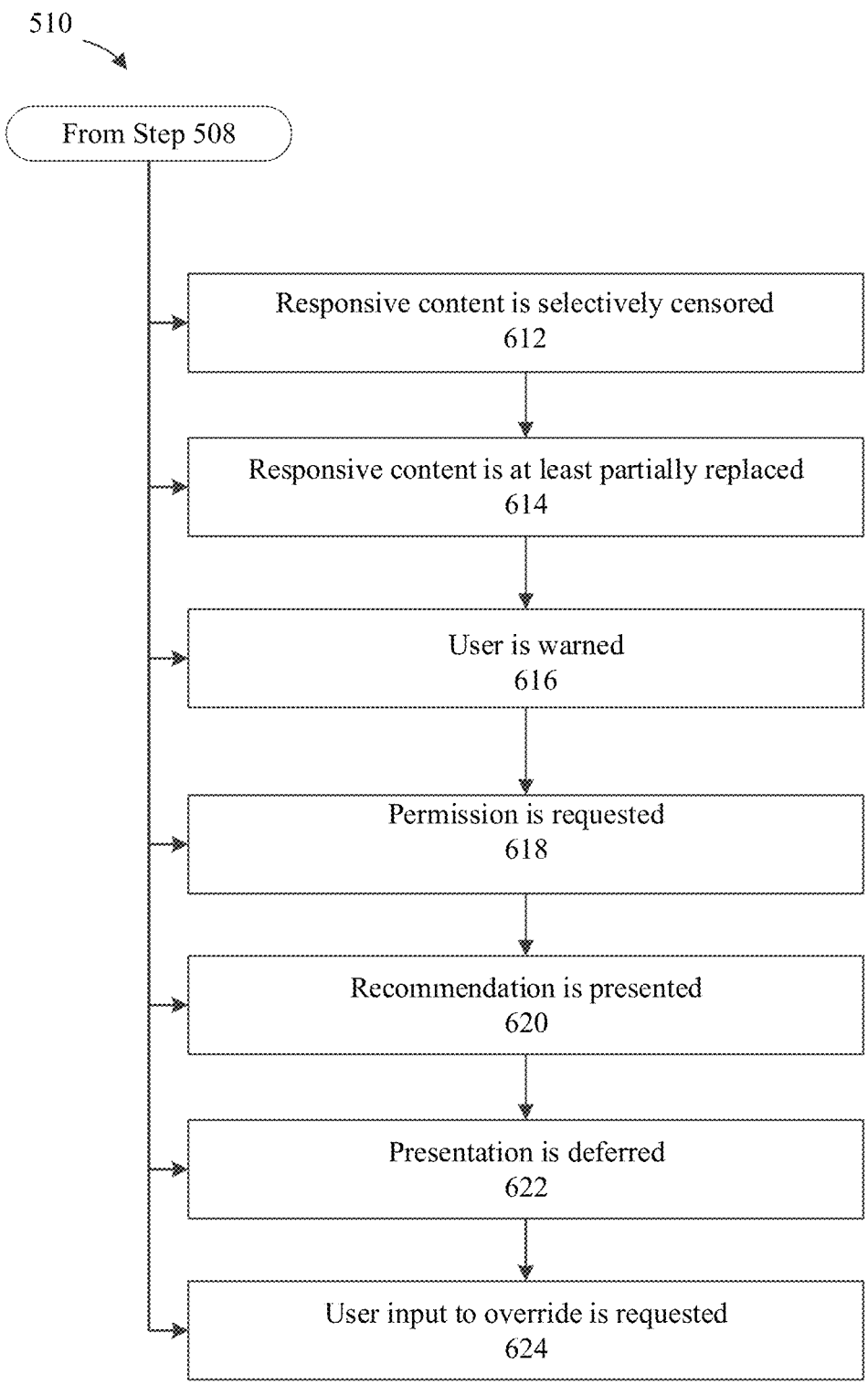
FIG. 6 is a flowchart illustrating operation 510 of the method illustrated by FIG. 5.

Referring now to FIG. 6, flowchart 600 illustrates various examples of the selective formatting/censoring/tailoring resulting from operation 510 of FIG. 3. Operation 510 may comprise one or more of the example operations illustrated by flowchart 600.

At reference numeral 612, the responsive content may be selectively censored and presented. For example, when the responsive content includes visual media, that content may be presented with a mosaic, a censor bar, or reformatted so as to obfuscate the potentially offending portion(s). When the responsive content includes audible media, the content may be presented with the potentially offending portion(s) bleeped, dropped, or replaced with a selected "dummy" word. Still further, when the content is textual, the potentially offending portions may be skipped or blacked out.

At reference numeral 614, the responsive content is partially or completely replaced with substantially similar content. In one exemplary implementation, this operation may include executing a second (or another) search for second search results. So, for example, in the case of audio media, a radio friendly edit of a song without offensive lyrics might be returned. In the case of textual media, alternatively authored and/or sourced content may be found and presented.

At reference numeral 616, a warning may precede the presentation of the responsive content. This warning may be a sound, speech, a graphic and/or other appropriate and effective mode of communicating the warning.

At reference numeral 618, a request for permission from the user to present the responsive content may be provided. Additionally, or alternatively, presentation of the responsive content may be deferred until permission is received from the user.

At reference numeral 620, a recommendation for or against presentation of the responsive content may precede presentation. Additionally, or alternatively, presentation of the responsive content may be deferred for a specified time interval so that the user may respond to the recommendation.

At reference numeral 622, presentation of the responsive content may be deferred.

At reference numeral 624, a user input to override tailoring the presentation of the responsive content may be requested and/or received.

VI. Illustrative Alternative Example of End User Device

In system 100 of FIG. 1B, the digital personal assistant backend is located remotely with respect to user computing device 102. This, of course, is just one arrangement contemplated by the inventors.

Figure 7:
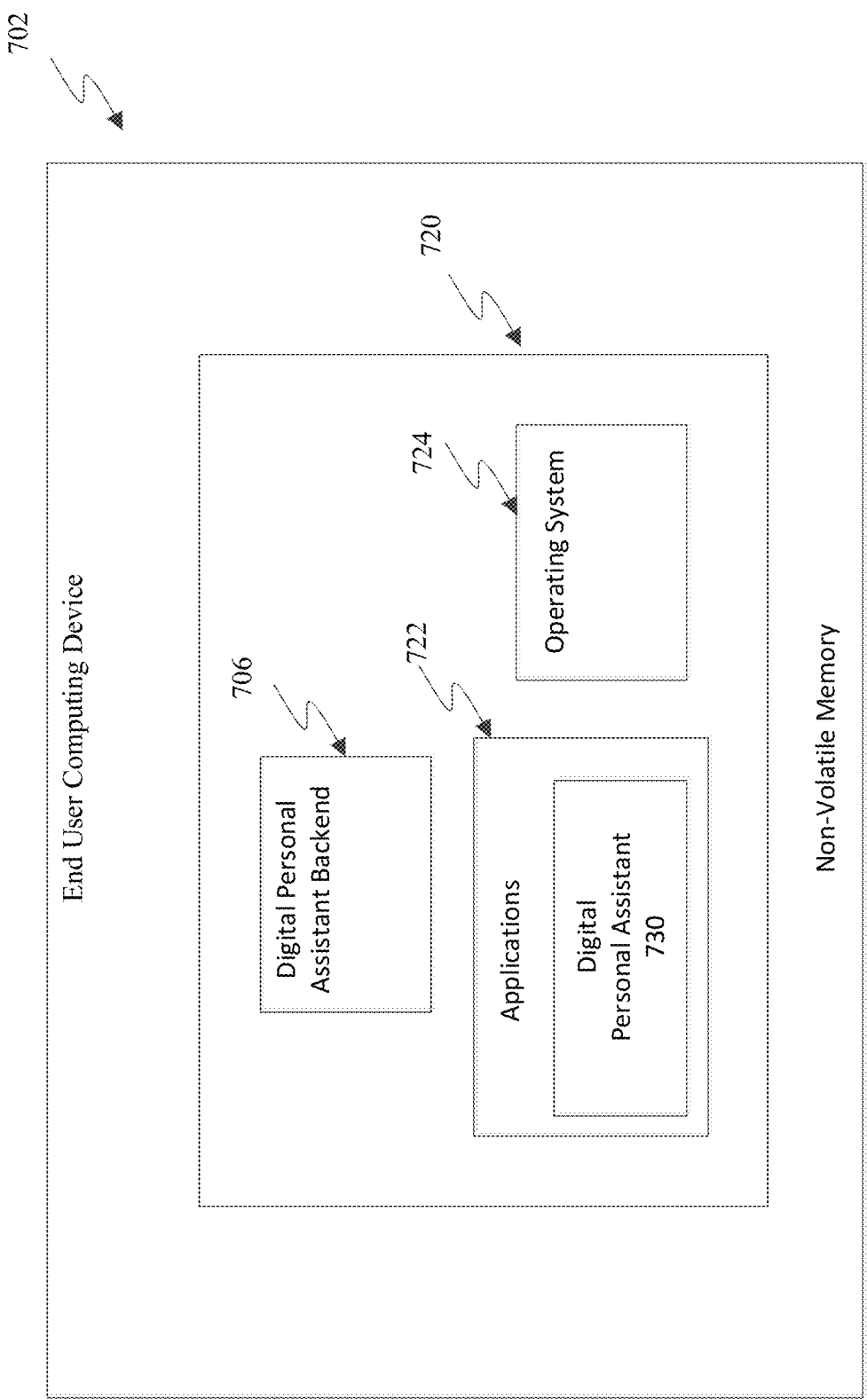
FIG. 7 is a simplified block diagram illustrating an example of an end user device that is usable in the system of FIG. 1 to implement a digital personal assistant that tailors responsive outputs in a manner that is consistent with one or more embodiments of the present invention, in which the digital personal assistant is included within the user computing device.

FIG. 7 is a block diagram of an alternative implementation in which the digital personal assistant backend 706 is actually included within an end user device 702. In particular, as shown in FIG. 7, end user device 702 includes a digital personal assistant 730 that is analogous to digital personal assistant 130 of system 100 of FIG. 1 and that performs similar functions. The digital personal assistant 730 is located in the non-volatile memory 720, along with the operating system 724 and the digital personal assistant backend 706.

In the configuration of FIG. 7, the end user device 702 does not require an avenue of communication between it and the digital personal assistant backend 706. Accordingly, the inclusion or presence of a network, such as network 104 of FIG. 1A is optional. Inclusion of a network permits the digital personal assistant 730 to access and retrieve remotely stored information from, for example, one or more data stores (not shown). Such data stores may store, for example, demographic information, aggregated search engine information from lookalike users, or other information usable to infer a user's sensibilities.

It is to be understood that the arrangement of FIG. 7 is but one alternative example. Various other locations of the digital personal assistant backend, including distributed arrangements, are both possible and contemplated. For example, the digital personal assistant may be executed remotely with respect to the user computing device.

VII. Illustrative Alternative Example of a Mobile End User Device

Figure 8:
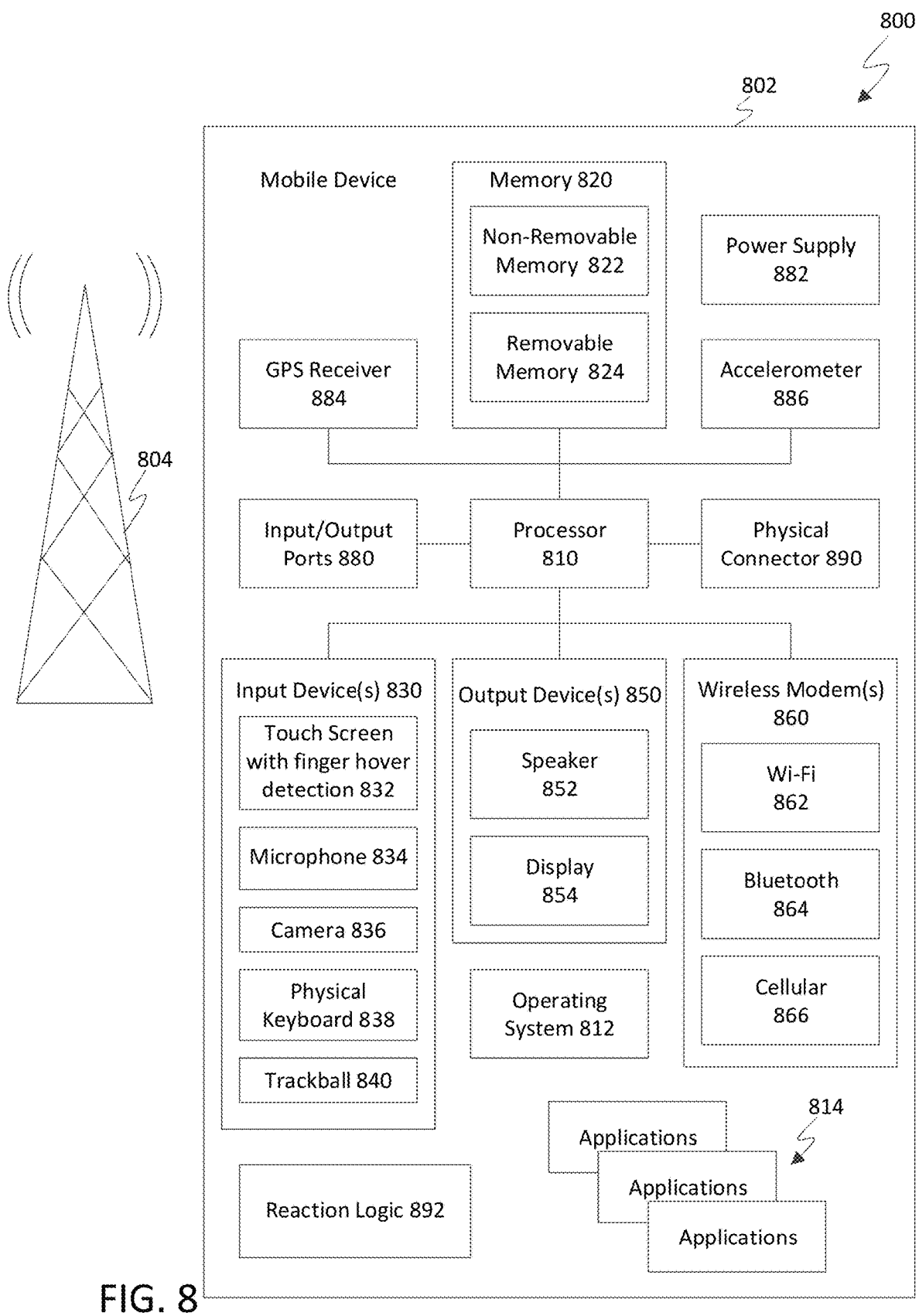
FIG. 8 is a block diagram illustrating an example of a mobile device of FIG. 1 that may be used to implement a digital personal assistant that tailors responsive outputs in a manner that is consistent with one or more embodiments of the present invention.

FIG. 8 is a block diagram of an exemplary mobile device 802 that may be used to implement end user device 102c of FIG. 1. As shown in FIG. 8, mobile device 802 includes a variety of optional hardware and software components. Any component in mobile device 802 can communicate with any other component, although not all connections are shown for ease of illustration. Mobile device 802 can be any of a variety of computing devices (e.g., cell phone, smartphone, handheld computer, Personal Digital Assistant (PDA), etc.) and can allow wireless two-way communications with one or more mobile communications networks 804, such as a cellular or satellite network, or with a local area or wide area network. The description of mobile device 802 provided herein is provided for purposes of illustration, and is not intended to be limiting. It is to be understood that one or more embodiments of the present invention may be implemented in other types of mobile devices or mobile devices of other configurations.

The illustrated mobile device 802 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components of mobile device 802 and support for one or more application programs 814 (also referred to as "applications" or "apps"). Application programs 814 may include common mobile computing applications (e.g., e-mail applications, calendars, contact managers, Web browsers, messaging applications) and any other computing applications (e.g., word processing applications, mapping applications, media player applications). In one or more embodiments, application programs 814 include digital personal assistant 130.

The illustrated mobile device 802 can include memory 820. Memory 820 can include non-removable memory 822 and/or removable memory 824. Non-removable memory 822 can include RAM, ROM, flash memory, a hard disk, or other well-known memory devices or technologies. Removable memory 824 can include flash memory or a Subscriber Identity Module (SIM) card, which is well known in GSM communication systems, or other well-known memory devices or technologies, such as "smart cards." Memory 820 can be used for storing data and/or code for running operating system 812 and applications 814. Example data can include Web pages, text, images, sound files, video data, or other data to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 802 can support one or more input devices 830, such as a touch screen 832, a microphone 834, a camera 836, a physical keyboard 838 and/or a trackball 840 and one or more output devices 850, such as a speaker 852 and a display 854. Touch screens, such as touch screen 832, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens.

Other possible output devices (not shown) can include piezoelectric or other haptic output devices. Some devices can serve more than one input/output function. For example, touch screen 832 and display 854 can be combined in a single input/output device. The input devices 830 can include a Natural User Interface (NUI).

Wireless modem(s) 860 can be coupled to antenna(s) (not shown) and can support two-way communications between the processor 810 and external devices, as is well understood in the art. The modem(s) 860 are shown generically and can include a cellular modem 866 for communicating with the mobile communication network 804 and/or other radio-based modems (e.g., Bluetooth 864 and/or Wi-Fi 862). At least one of the wireless modem(s) 860 is typically configured for communication with one or more cellular networks, such as a GSM network for data and voice communications within a single cellular network, between cellular networks, or between the mobile device and a public switched telephone network (PSTN).

Mobile device 802 can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components of mobile device 802 are not required or all-inclusive, as any components can be deleted and other components can be added as would be recognized by one skilled in the art.

In one or more embodiments, certain components of mobile device 802 are configured to perform the operations attributed to digital personal assistant 130 as described in preceding sections. Computer program logic for performing the operations attributed to digital personal assistant 130 as described above may be stored in memory 820 and executed by processor 810. By executing such computer program logic, processor 810 may be caused to implement any of the features of digital personal assistant 130 as described above in reference to FIG. 1. Also, by executing such computer program logic, processor 810 may be caused to perform any or all of the steps of any or all of the flowcharts depicted in FIGS. 3-6.

As a client computing device, the mobile device 802 can send requests to a server computing device and receive data in return from the server computing device.

The mobile device 802 can be part of an implementation environment in which various types of services (e.g., computing services) are provided by a computing "cloud." Some tasks (e.g., processing user input and presenting a user interface) can be performed on local computing devices (e.g., connected devices) while other tasks (e.g., storage of data to be used in subsequent processing, weighting of data and ranking of data) can be performed in the cloud.

Although FIG. 8 illustrates a mobile device 802, more generally, the innovations described herein can be implemented with devices having other screen capabilities and device form factors, such as a desktop computer, a television screen, or device connected to a television (e.g., a set-top box or gaming console). Services can be provided by the cloud through service providers or through other providers of online services. Additionally, since the technologies described herein may relate to audio streaming, a device screen may not be required or used (a display may be used in instances when audio/video content is being streamed to a multimedia endpoint device with video playback capabilities).

VIII. Illustrative Example of Computer System

Figure 9:
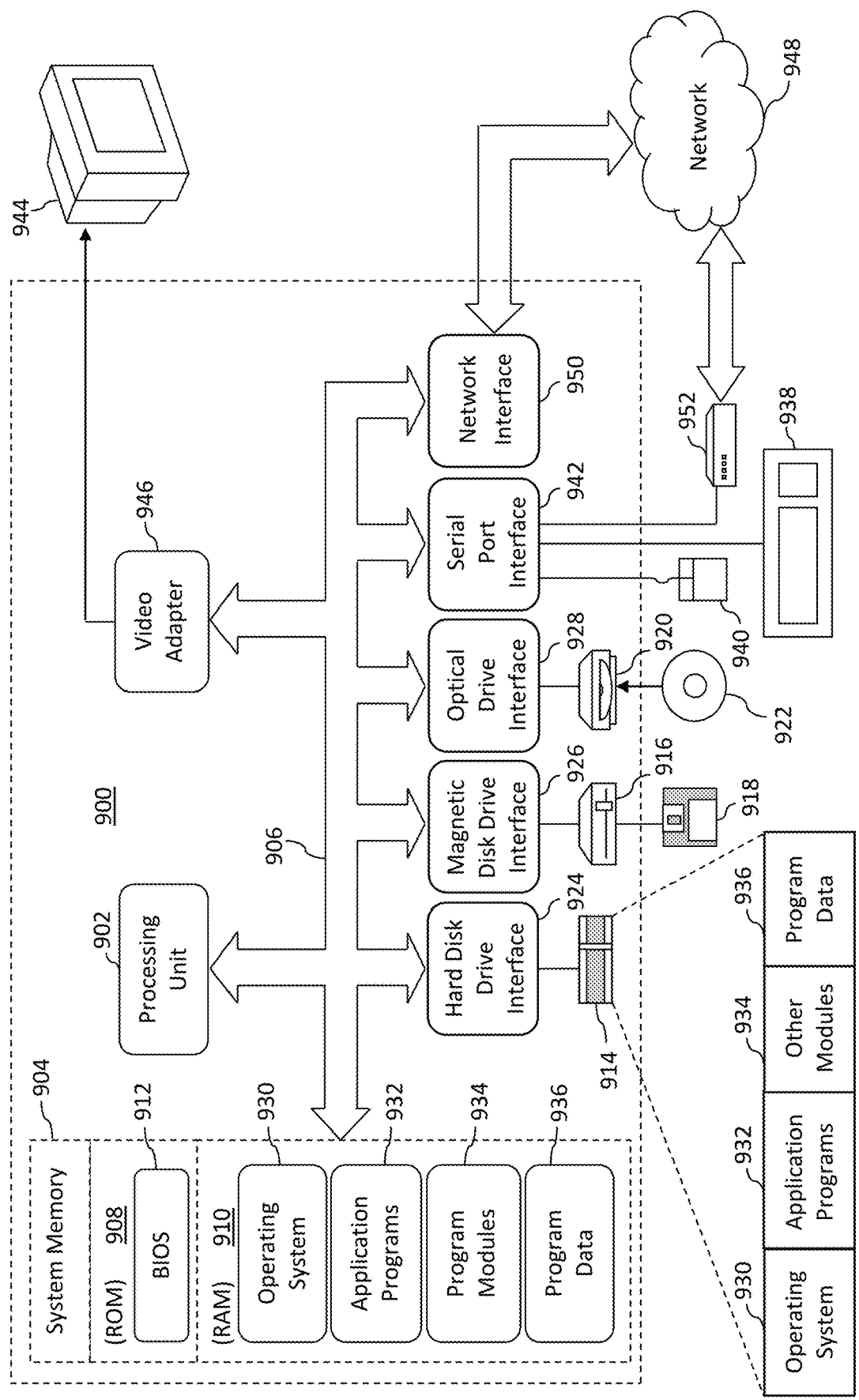
FIG. 9 is a block diagram illustrating an example of a general computing device of FIG. 1 that may be used to implement a digital personal assistant that tailors responsive outputs in a manner that is consistent with one or more embodiments of the present invention.

FIG. 9 depicts an example processor-based computer system 900 that may be used to implement end user device 102a or any of the computers used to implement digital personal assistant backend 106 as described above in reference to FIG. 1. The description of system 900 provided herein is provided for purposes of illustration, and is not intended to be limiting. One or more embodiments of the present invention may be implemented in other types of computer systems or in computer systems of other configurations.

As shown in FIG. 9, system 900 includes a processing unit 902, a system memory 904, and a bus 906 that couples various system components including system memory 904 to processing unit 902. Processing unit 902 may comprise one or more microprocessors or microprocessor cores. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

System 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, BLU-RAY™ disk or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 930, one or more application programs 932, other program modules 934, and program data 936. In accordance with various embodiments, the program modules may include computer program logic that is executable by processing unit 902 to perform any or all of the functions and features of end user device 102 or any of the computers used to implement digital personal assistant backend 106 as described above in reference to FIG. 1. The program modules may also include computer program logic that, when executed by processing unit 902, performs any of the steps or operations shown or described in reference to the flowcharts of FIGS. 3-6.

A user may enter commands and information into system 900 through input devices such as a keyboard 838 and a pointing device 940. Other input devices (not shown) may include a microphone, joystick, game controller, scanner, or the like. In one or more embodiments, a touch screen is provided in conjunction with a display 944 to allow a user to provide user input via the application of a touch (as by a finger or stylus for example) to one or more points on the touch screen. These and other input devices are often connected to processing unit 902 through a serial port interface 942 that is coupled to bus 906, but may be connected by other interfaces, such as a parallel port, game port, or a universal serial bus (USB). Such interfaces may be wired or wireless interfaces.

A display 944 is also connected to bus 906 via an interface, such as a video adapter 946. In addition to display 944, system 900 may include other peripheral output devices (not shown) such as speakers and printers.

System 900 is connected to a network 848 (e.g., a local area network or wide area network such as the Internet) through a network interface or adapter 950, a modem 952, or other suitable means for establishing communications over the network. Modem 952, which may be internal or external, is connected to bus 906 via serial port interface 942.

The hard disk associated with hard disk drive 914, the removable magnetic disk 918, the removable optical disk 922, are examples of storage media.

As noted above, computer programs and modules (including application programs 932 and other program modules 934) may be stored on storage media. Such computer programs may also be received via network interface 950, serial port interface 942, or any other interface type. Such computer programs, when executed or loaded by an application, enable computer 900 to implement features of embodiments of the present invention discussed herein. Accordingly, such computer programs represent controllers of the system 900.

In alternative implementations, system 900 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

IX. Examples of Implementation Scenarios

Various contemplated implementations of innovations disclosed in this application are discussed. These examples reflect non-limiting proactive additive, proactive subtractive, and proactive additive and subtractive implementations.

One contemplated implementation of innovations disclosed in this application is in the setting of meetings and/or invites to social functions. In this implantation, multiple inputs from multiple users of respective end user devices (e.g., 102*a*-102*e* of FIG. 1A) can be received and aggregated. Additionally, or alternatively, these inputs (which are data) maybe leveraged by identification of "lookalike" users that may even include some of the users and the receipt of aggregates search engine data corresponding to the lookalike users. This information would provide a more robust baseline to resolve candidate times and/or locations, for example, to meet and even mark calendar. This is an example of a proactive additive implementation.

Another contemplated implementation of innovations disclosed in this application is the provision of music and/or video content. Artists have more freedom than ever to express themselves. As a result, many songs include lyrics that can be potentially offensive to some and can be inappropriate in some contexts of use (e.g., in a business office, a pre-school, or a church). A personal digital assistant or such functionality that is consistent with one or more embodiments of the present invention would be able to intelligently present songs with such lyrics by tailoring their presentation so as to provide responsive content while simultaneously. comporting with a user's sensibilities and complying with requirements and/or constraints associated with a particular context of use. This contemplated implantation can be applied to the provision of E-services including for example, video, pictures, and their combinations with and without audio. These are examples of proactive subtractive implementations.

Still another contemplated complimentary implementation would be in selectable parental controls A personal digital assistant or such functionality that is consistent with one or more embodiments of the present invention would be particularly adept at providing dynamic and individualized parental controls of a media device. This is an example of a proactive subtractive implementation.

Yet another contemplated implementation of innovations disclosed in this application is in vehicle or search engine navigation. A personal digital assistant or such functionality that is consistent with one or more embodiments of the present invention would be able to intelligently select information to provide to a driver and which information might be better presented in a modified manner. These decisions, for example, could be based on:

(1) a vehicle location and time of day (i.e., context of use);
(2) a type of route (e.g., highways) that a driver would likely want to travel (i.e., user's sensibilities);
(3) points of interest (e.g., fast food restaurants vs. healthier food options) that the driver would be unlikely to visit (i.e., user's sensibilities).

This is an example of a hybrid proactive additive and subtractive implementation.

X. Closing

It is to be appreciated that one or more embodiments of the present invention may include computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable media include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

It is to be appreciated that the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Additionally, consistent with one or more contemplated embodiments of the present invention, the digital personal assistant may use any of a variety of artificial intelligence techniques to improve its performance over time through continued interactions with the user. Accordingly, it is reiterated that the disclosed invention is not limited to any particular computer or type of hardware.

It is also to be appreciated that each component of logic (which also may be called a "module" or "engine" the like) of a system such as the system 200 described in FIG. 2 above, and which operates on a computing device, can be implemented using the one or more processing units of one or more computers and one or more computer programs processed by the one or more processing units. A computer program includes computer-executable instructions and/or computer-interpreted instructions, such as program modules, which instructions are processed by one or more processing units in the one or more computers. Generally, such instructions define routines, programs, objects, components, data structures, and so on, that, when processed by a processing unit, instruct the processing unit to perform operations on data or configure the processor or computer to implement various components or data structures. Such components have inputs and outputs by accessing data in storage or memory and storing data in storage or memory.

Further, the inventors reiterate and it is to be appreciated that systems consistent with contemplated embodiments of the present invention, such as system 100 of FIGS. 1A and 1B, may be practiced in distributed computing environments where operations are performed by multiple computers that are linked through a communications network. In a distributed computing environment, computer programs may be located in local and/or remote storage media.

Still further, it is to be understood that instances of the terms "article of manufacture," "process," "machine," and/or "composition of matter" in any preambles of the appended claims are intended to limit the claims to subject matter deemed to fall within the scope of patentable subject matter defined by the use of these terms in 35 U.S.C. § 101.

As the foregoing illustrates, one or more embodiments described herein advantageously implement digital personal assistant functionality that is capable of enhancing a user's experience with a "smart" or seemingly at least semi-sentient digital personal assistant functionality. Enhancing the user experience, in turn, reduces barriers (e.g., distrust) to adoption, use, and/expanded use of such assistants.

As the foregoing also illustrates, one or more embodiments described herein advantageously implement a digital personal assistant functionality that is capable of determining that a user has made a request of the digital personal assistant, obtain information, or perform some other task on behalf of the user. In response to determining that the user has asked such a request, the digital personal assistant provides a response thereto that is consistent with the user's sensibilities by tailoring the responsive output to match those sensibilities and to match a context of use.

As the foregoing also illustrates, one or more embodiments described herein advantageously implement a method of selectively tailoring the presentation of responsive content to a user. Based on a deduced context of use and inferred user sensibilities, the presentation is selectively tailored so that the user is not presented with content that he/she may find objectionable.

As the foregoing also illustrates, one or more embodiments described herein implement an approach to dynamically adapting the provision of information to a user. Machine learning and/or reasoning mechanisms are employed to infer user sensibilities and a detected context of use. Then, those inferred user sensibilities and detected context are used to facilitate the provision of a customized user experience that is tailored to the user's sensibilities. A user's sensibilities may include aspects of the user's ethical and moral beliefs, and may be inferred based on prior interaction(s) of the user.

As the foregoing also illustrates, one or more embodiments of the present invention can advantageously increase the level of engagement between a user and a digital personal assistant and also promote trust/confidence between the user and the assistant, thereby facilitating continued and/or increased use of and interaction with the digital personal assistant.

Although selected embodiments of the present invention have been shown and described individually, it is to be understood that at least aspects of the described embodiments may be combined. Also, it is to be understood the present invention is not limited to the described embodiment (s). Instead, it is to be appreciated that changes may be made to the one or more disclosed embodiments without departing from the principles and spirit of the invention, the scope of which is defined by the claims and the equivalents thereof. It should be understood that the subject matter defined in the appended claims is not necessarily limited to the specific implementations described above. The specific implementations described above are disclosed as examples only.

What is claimed is:

1. A method performed by a computing system, the method comprising:
   receiving a query from a computing device that is in network communication with the computing system;
   identifying content based upon the query, wherein the content is identified as being relevant to the query;
   prior to returning the content to the computing device, providing the content to a computer-implemented model that is assigned to a user of the computing device, wherein the computer-implemented model has been trained based upon previous interactions of the user with other content that has been returned to the user such that the computer-implemented model is customized for the user, and further wherein the computer-implemented model generates an output based upon the content provided to the computer-implemented model, the output indicates that a portion of the content is likely to be deemed profane by the user;
   based upon the output generated by the computer-implemented model, modifying the content to obfuscate the portion of the content that has been identified by the computer-implemented model as likely to be deemed profane by the user; and
   subsequent to modifying the content, transmitting the modified content to the computing device for presentment to the user such that, when the modified content is presented, the portion of the content is not presented to the user.

2. The method of claim 1, further comprising providing data in a profile of the user to the computer-implemented model, wherein the computer-implemented model generates the output based upon the data in the profile of the user.

3. The method of claim 1, further comprising receiving data from a sensor associated with the computing device, wherein the computer-implemented model generates the output based upon the data from the sensor.

4. The method of claim 3, wherein the data from the sensor is representative of speech of the user.

5. The method of claim 3, wherein the data from the sensor is representative of environmental sounds characteristic of a locale of the user.

6. The method of claim 1, wherein the method is performed by the computing system based upon the computing system executing a personal digital assistant.

7. The method of claim 1, further comprising enhancing the content based upon a user profile of the user to form modified and enhanced content, wherein the modified enhanced content is transmitted to the computing device.

8. A computing system comprising:
a processor; and
memory storing instructions that, when executed by the processor, cause the processor to perform acts comprising:
receiving a from a computing device that is in network communication with the computing system;
obtaining content based upon the query, wherein the content is identified as being relevant to the query;
in response to obtaining the content, providing the responsive content to a computer-implemented model that is customized for a user of the computing device, and further wherein the computer-implemented model has been trained to identify content portions that are likely to be deemed profane by the user upon receipt of the content portions;
receiving, from the computer-implemented model, an an indication that a portion of the content is likely to be deemed profane by the user, wherein the computer-implemented model generates the indication based upon the content;
based upon the indication generated by the computer-implemented model, modifying the content to obfuscate the portion of the content that has been identified by the computer-implemented model as likely to be deemed profane by the user; and
subsequent to modifying the content, transmitting the modified content to the computing device, wherein the modified content, when presented by way of the computing device, does not include the portion of the content.

9. The computing system of claim 8, the acts further comprising providing data in a profile of the user to the computer-implemented model, wherein the computer-implemented model generates the indication based upon the data in the profile of the user.

10. The computing system of claim 8, the acts further comprising receiving data from a sensor associated with the computing device, wherein the computer-implemented model generates the indication based upon the data from the sensor.

11. The computing system of claim 10, wherein the data from the sensor is representative of speech of the user.

12. The computing system of claim 10, wherein the data from the sensor is representative of environmental sounds characteristic of a locale of the user.

13. The computing system of claim 8, wherein the acts are performed by the processor based upon the processor executing a personal digital assistant.

14. The computing system of claim 8, the acts further comprising enhancing the content based upon a user profile of the user such that enhanced modified content is formed, wherein the enhanced modified content is transmitted to the computing device.

15. A non-transitory computer-readable medium comprising instructions that, when executed by a processor, cause the processor to perform acts comprising:
receiving a query from a computing device that is in network communication with a computing system that comprises the non-transitory computer-readable medium and the processor;
identifying content based upon the query, wherein the content is identified as being relevant to the query;
in response to identifying the content, providing the content to a computer-implemented model that is assigned to the user, wherein the computer-implemented model has been trained to identify content portions that are likely to be deemed profane by the user, wherein the computer-implemented model has been trained based upon previous interactions of the user with other content that has been returned to the user;
receiving, from the computer-implemented model an output generated by the computer-implemented model based upon the content provided to the computer-implemented model, the output identifies a portion of the content that is likely to be deemed profane by the user;
based upon the output generated by the computer-implemented model, modifying the content to obfuscate the portion of the responsive content that has been identified by the computer-implemented model as likely being profane to the user; and
subsequent to the content being modified, transmitting the modified content to the computing device for presentment to the user, wherein the modified content fails to include the portion of the content identified by the computer-implemented model as likely being profane to the user.

16. The non-transitory computer-readable medium of claim 15, the acts further comprising providing data in a profile of the user to the computer-implemented model, wherein the computer-implemented model generates the output based upon the data in the profile of the user.

17. The non-transitory computer-readable medium of claim 15, the acts further comprising receiving data from a sensor associated with the computing device, wherein the computer-implemented model generates the output based upon the data from the sensor.

18. The non-transitory computer-readable medium of claim 17, wherein the data from the sensor is representative of speech of the user.

19. The non-transitory computer-readable medium of claim 17, wherein the data from the sensor is representative of environmental sounds characteristic of a locale of the user.

20. The non-transitory computer-readable medium of claim 15, wherein the acts are performed based upon the processor executing a personal digital assistant.

* * * * *